US009581224B1

(12) United States Patent
Anderfaas

(10) Patent No.: US 9,581,224 B1
(45) Date of Patent: Feb. 28, 2017

(54) FINAL DRIVE CHAIN ADJUSTER FOR SINGLE AND MULTI TRACK VEHICLES

(71) Applicant: Eric N. Anderfaas, Westminister, CA (US)

(72) Inventor: Eric N. Anderfaas, Westminister, CA (US)

(*) Notice: Subject to any disclaimer, the term of this patent is extended or adjusted under 35 U.S.C. 154(b) by 230 days.

(21) Appl. No.: 14/215,732

(22) Filed: Mar. 17, 2014

Related U.S. Application Data

(60) Provisional application No. 61/802,494, filed on Mar. 16, 2013.

(51) Int. Cl.
*F16H 7/12* (2006.01)

(52) U.S. Cl.
CPC ..................... *F16H 7/12* (2013.01)

(58) Field of Classification Search
CPC .. F16H 7/12; F16H 7/1281; F16H 2007/0893; F16H 2007/081; F16H 2007/048; F16H 2007/0874; B62M 9/121; B62M 9/16; B62M 9/126
USPC ......................................... 474/103
See application file for complete search history.

(56) References Cited

U.S. PATENT DOCUMENTS

| | | | |
|---|---|---|---|
| 2,419,703 A | 4/1947 | Bartlett | |
| 3,834,246 A | 9/1974 | McGilp | |
| 4,003,443 A | 1/1977 | Boughers | |
| 4,034,821 A | 7/1977 | Stoddard et al. | |
| 4,299,582 A | 11/1981 | Leitner | |
| 4,433,747 A | 2/1984 | Offenstadt | |
| 4,705,494 A | 11/1987 | Gibson | |
| 7,409,877 B2 | 8/2008 | Askey | |
| 7,572,199 B1 * | 8/2009 | Calendrille, Jr. | ........ B62M 9/16 474/80 |
| 7,661,687 B2 * | 2/2010 | Seki | ........................ B60G 3/24 180/373 |
| 2005/0181901 A1 * | 8/2005 | Shin | ...................... F16H 7/1218 474/134 |
| 2006/0089219 A1 * | 4/2006 | Maertens | ............. A01D 41/142 474/87 |
| 2009/0241742 A1 | 10/2009 | Gilgallon et al. | |
| 2009/0247334 A1 * | 10/2009 | Takachi | ................. B62M 9/126 474/82 |
| 2012/0010033 A1 * | 1/2012 | Schachtner | ......... F16C 11/0619 474/110 |
| 2014/0018199 A1 * | 1/2014 | Shahana | ................ B62M 9/126 474/82 |
| 2014/0031157 A1 * | 1/2014 | Takano | ..................... F16H 7/12 474/135 |

(Continued)

FOREIGN PATENT DOCUMENTS

JP 02005282818 A 10/2005

*Primary Examiner* — William E Dondero
*Assistant Examiner* — Robert T Reese
(74) *Attorney, Agent, or Firm* — Rod D. Baker

(57) ABSTRACT

A vehicular final drive chain path length compensation and adjustment system using an idler assembly which is moved in a prescribed geometry by a stiff system. The system and method maintains constant the chain path length during suspension travel. An idler arm assembly guides the idler assembly along an arc-shaped path, with displacement along this path determined not by a spring, but by a cam rotated by a trailing arm on the vehicle. The idler arm assembly allows for a simple static adjustment to compensate the chain path length for wear of components and tolerances in the vehicle assembly.

31 Claims, 33 Drawing Sheets

(56) References Cited

U.S. PATENT DOCUMENTS

| | | | | |
|---|---|---|---|---|
| 2014/0357437 | A1* | 12/2014 | Hara | F16H 7/12 |
| | | | | 474/113 |
| 2015/0275976 | A1* | 10/2015 | Tanaka | F16C 33/74 |
| | | | | 384/2 |
| 2016/0176478 | A1* | 6/2016 | Chang | B62M 9/1248 |
| | | | | 474/69 |

* cited by examiner

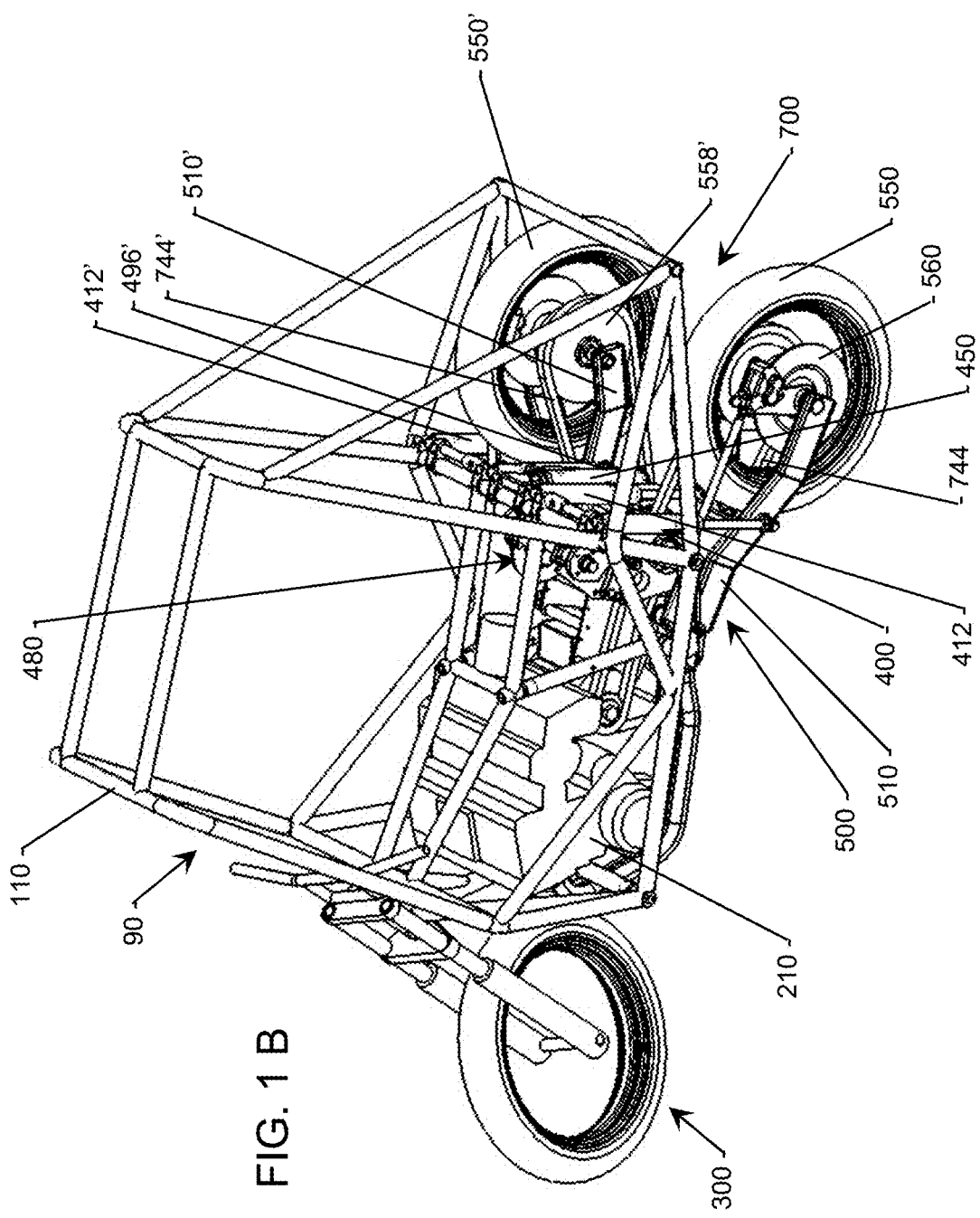

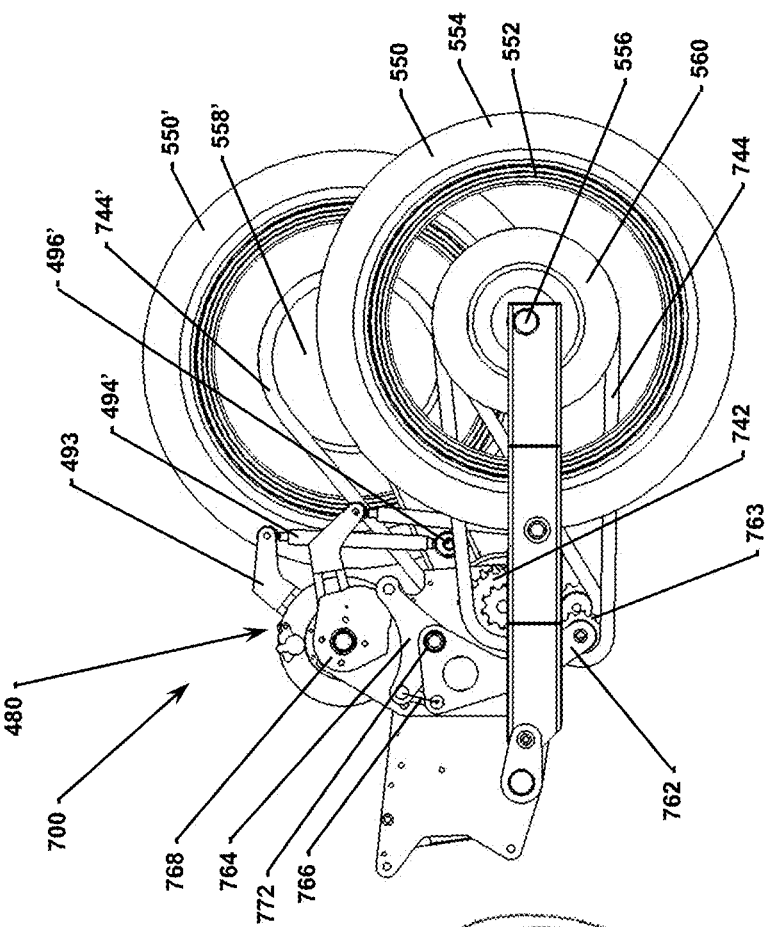
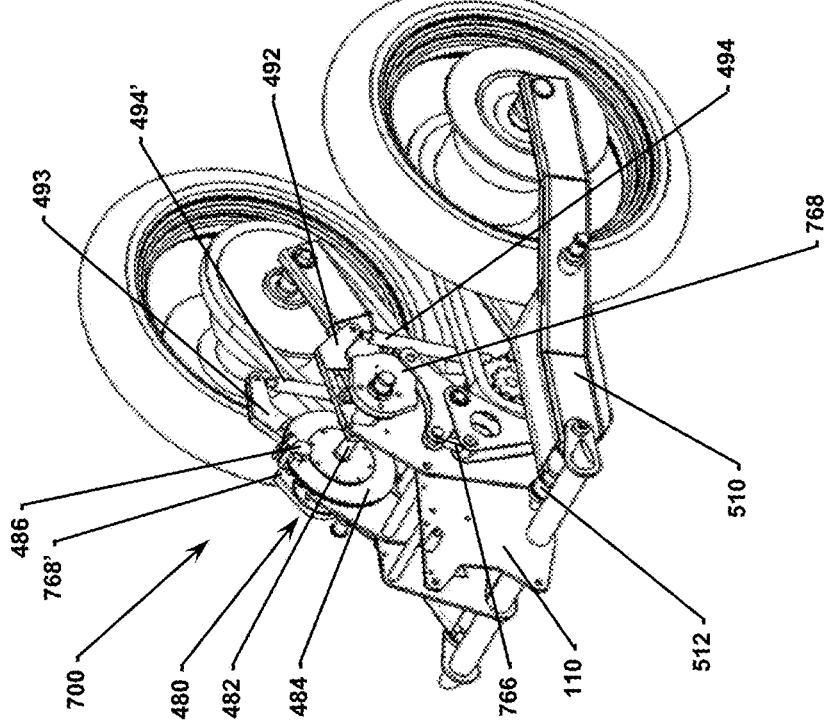
FIG. 2 D
FIG. 2 C

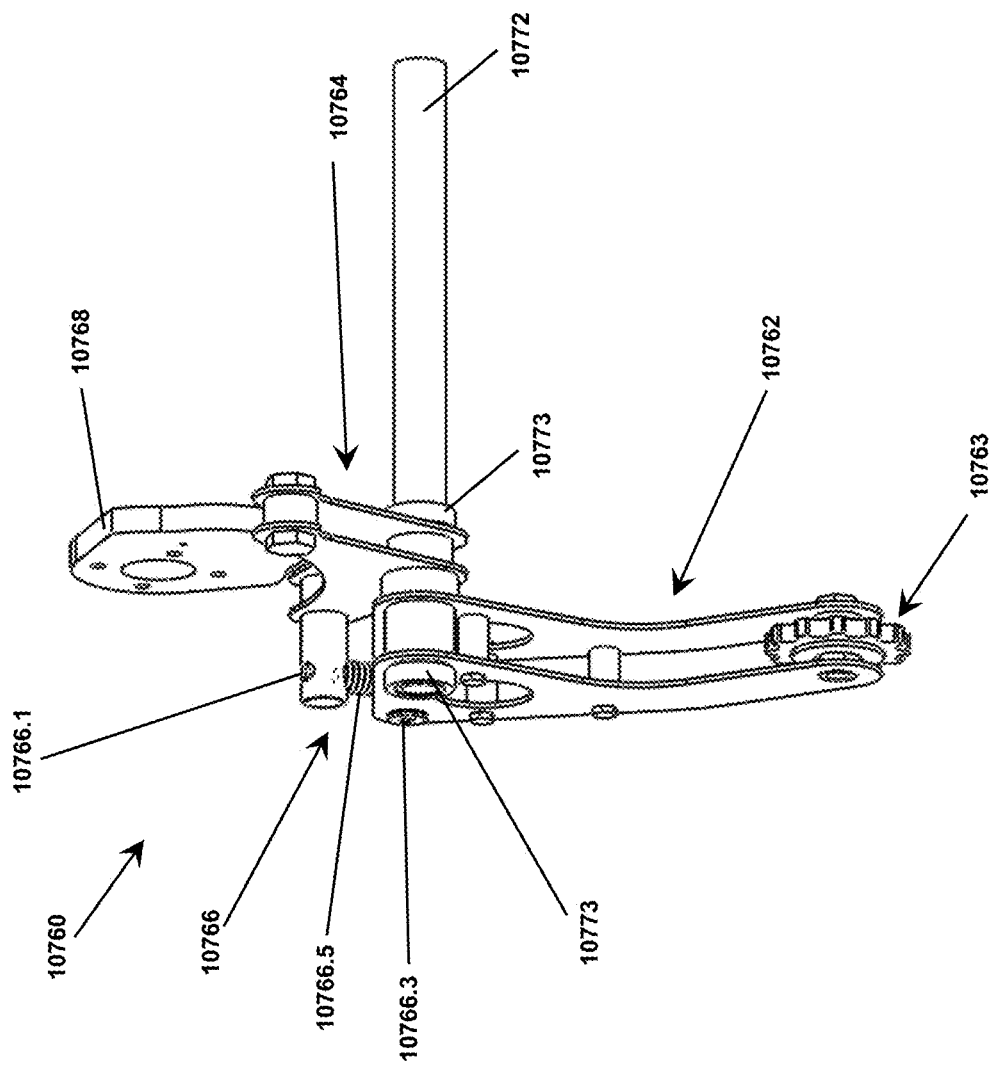

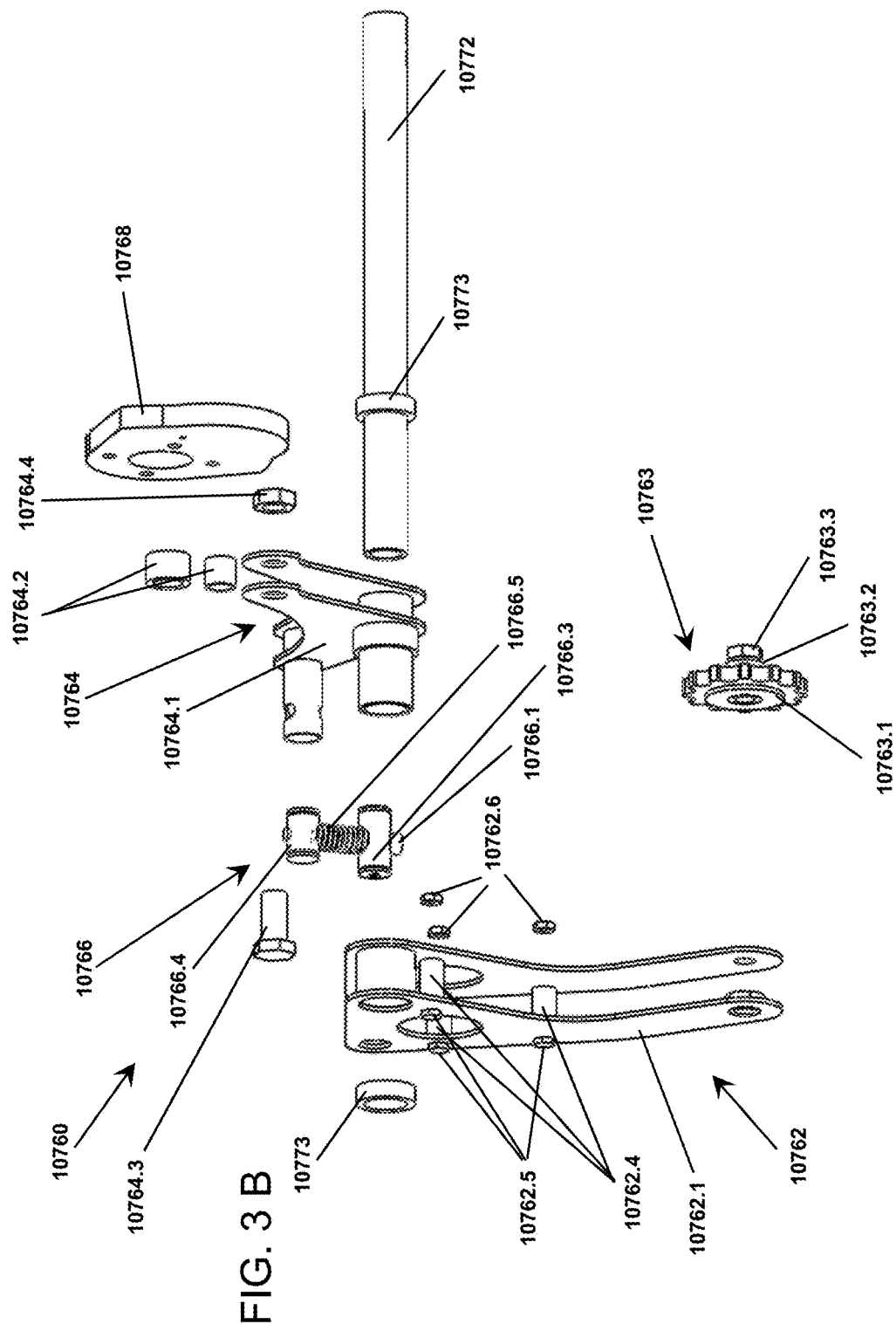

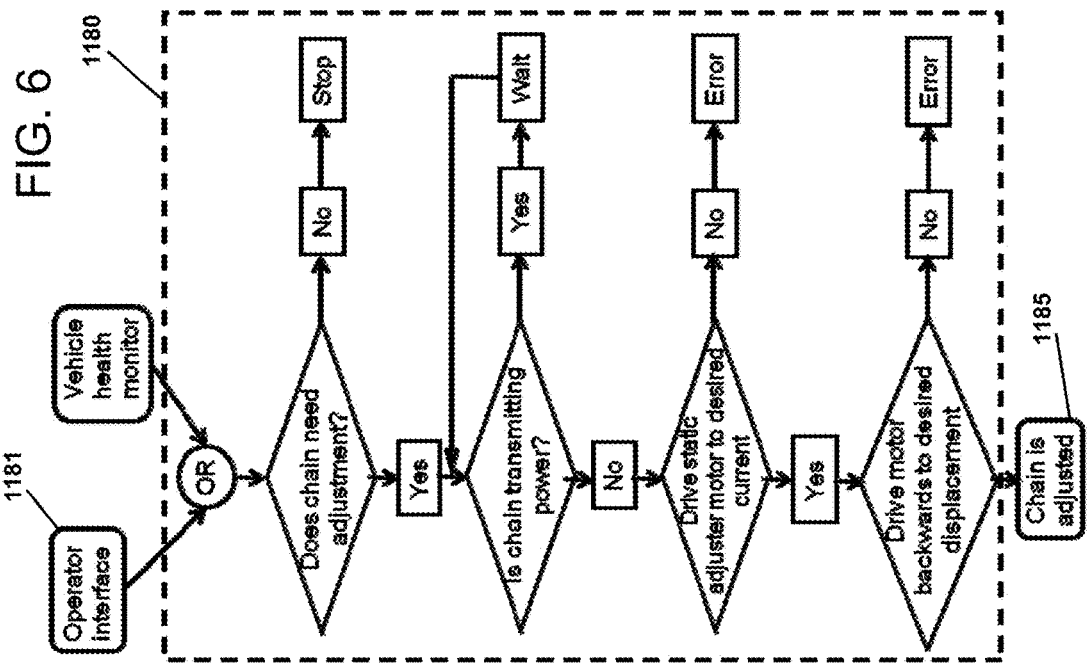

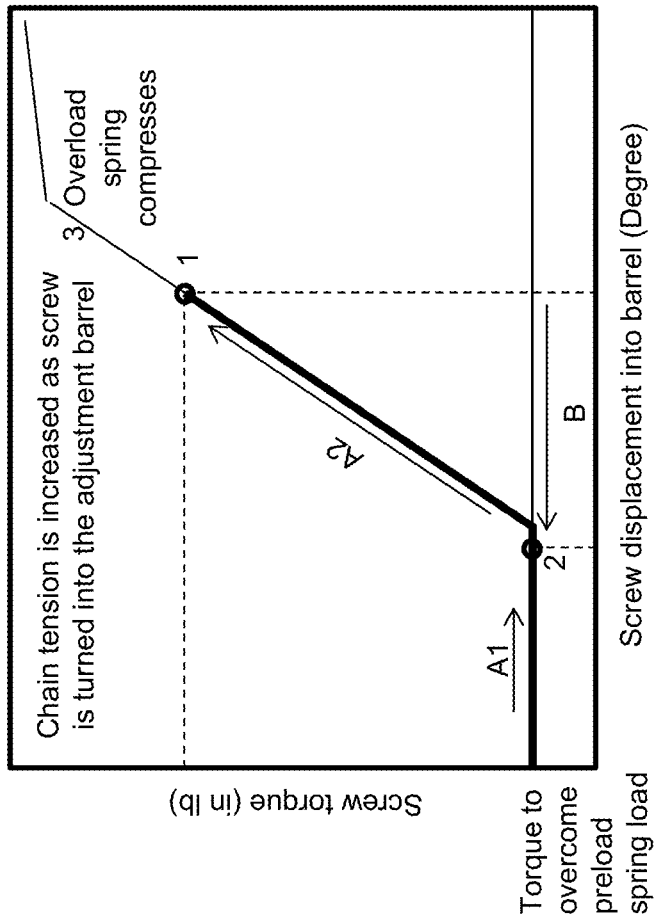

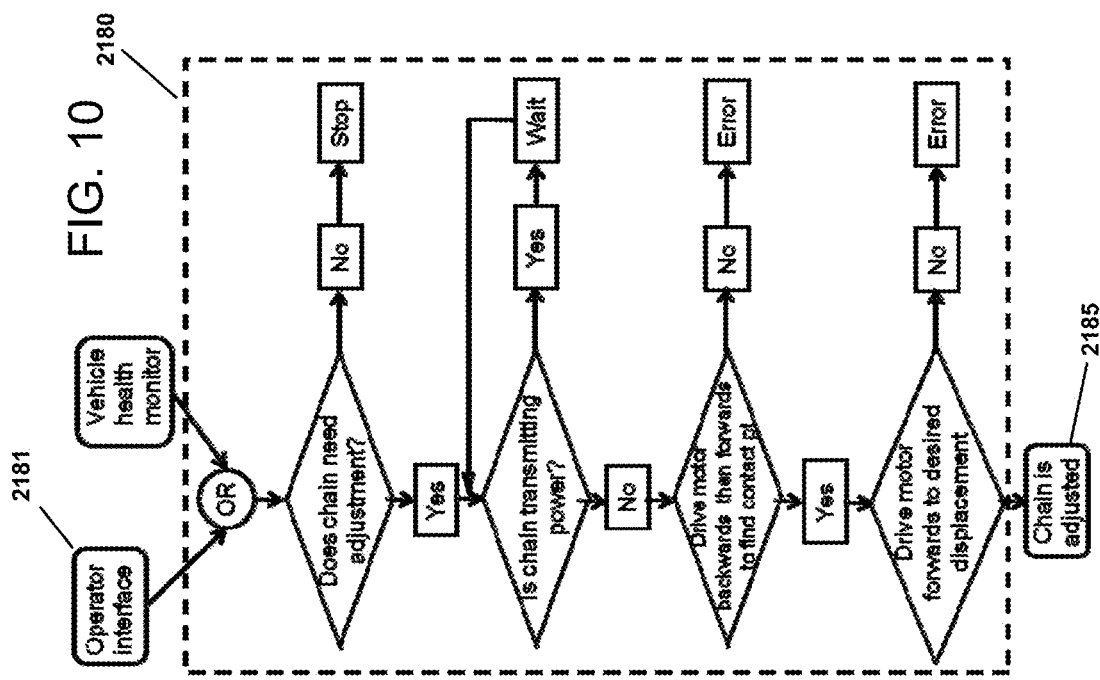

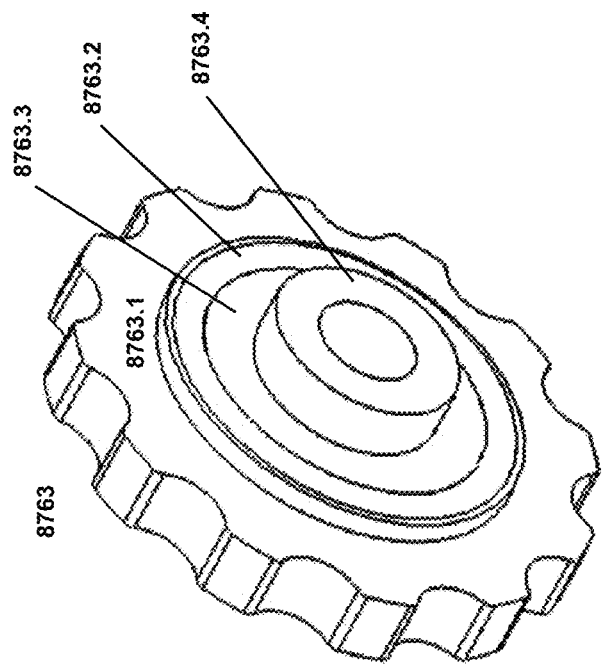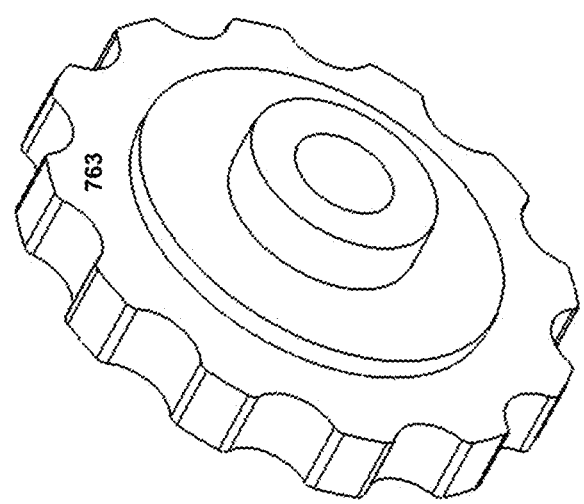
FIG. 21

FINAL DRIVE CHAIN ADJUSTER FOR SINGLE AND MULTI TRACK VEHICLES

CROSS-REFERENCE TO RELATED APPLICATIONS

This application claims the benefit of the filing of U.S. Provisional Patent Application Ser. No. 61/802,494 filed on Mar. 16, 2013, and the disclosure thereof is incorporated herein by reference.

BACKGROUND OF THE INVENTION

Field of the Invention

The present invention relates generally to a driveline system for a vehicle and, more particularly, to a final drive (chain or belt) adjusting system on a single track vehicle (e.g., motorcycle) or multi track vehicle having a trailing arm suspension. Yet more specifically, the present invention relates to a system and apparatus for providing both static and dynamic adjustment of the tension in an endless loop final drive.

Description of the Prior Art

Dynamic Chain Adjustment and Causes of Variations in Chain Tension:

Vehicles, such as motorcycles, often use a chain drive to deliver power from the motor or engine to one or more ground-engaging wheels. In the disclosure which follows, the term "chain drive" refers to the class of endless loop drive systems which may comprise a roller chain, silent chain, synchronous and non synchronous belt drive, or any other type drive in this class. Further, sprockets, pulleys, sheaves or the like may be referred to as "pinions." Chain drives are often used on vehicles such as motorcycles which employ a rear wheel connected to the vehicle main frame by means of a pivoting, trailing, swing arm.

In many chain driven vehicles, and in other instances where chain drives are used, a chain tensioner is employed to maintain tension in the final drive chain so that the chain is properly engaged with the chain sprockets, or pinions, on an output shaft and a rear wheel. These known chain tensioners, typically rollers, typically are biased toward the drive chain with a spring or other compliant biasing member. The force of the biasing member is such that, as the rear wheel bounces up and down with respect to the vehicle frame and output shaft (or driving pinion), the chain tensioner moves up and down by a spring force or torque to remain in contact with the drive chain, thereby preventing the chain from slipping on the pinions (or sprockets). Other types of tensioners include chain rubs that are fixably mounted to a motorcycle frame, such that a drive chain slides against the chain rub to thereby remove some of the slack that exists in the drive chain. These chain tensioners which account for the chain slack during suspension motion can be considered as "dynamic" chain tensioners.

Static Chain Adjustment:

In addition to a "dynamic" chain tensioner, there are known in the art "static" chain tension adjusters. Static adjusters are used to account for wear of the pinions and/or the chain, and also to accommodate manufacturing tolerances on the vehicle. Static adjustment typically is performed manually at regular maintenance intervals (depending on vehicle usage). One method for static adjustment of the chain is by moving the driven wheel relative to the trailing arm. To perform this type of static adjustment the vehicle must be stopped. The wheel axle must be loosened and the axle moved, typically with threaded adjusters on each side of the wheel. The wheel must be aligned so that the pinions are in the same plane, and the wheel axle must then be re-tightened. Problems arise if the wheel is not aligned properly; the chain may heat up and wear quickly, and/or the vehicle may exhibit poor handling qualities due to wheel misalignment. It also is possible to tighten the chain incorrectly, in such a fashion that the adjustment appears correct, but when the suspension is worked the chain becomes overloaded or overloads the vehicle's pinion shafts and bearings.

In addition to moving the driven wheel for static chain adjustment, another known method of static adjustment is to move the trailing arm pivot relative to the chassis. A static adjustment is carried out similarly to the fashion described above, except that the trailing arm pivot is loosened. In either of these methods, the adjustment process can be time consuming and messy.

Chain Drive Design Limitations:

Because of the dynamic chain tension variation due to suspension motion, typical chain drive designs locate the driving pinion as close as possible to the trailing arm pivot axis. In some designs, such as seen in U.S. Pat. No. 4,003,443, the driving pinion is located co-axially with the trailing arm pivot axis to eliminate chain tension variation. Although this reduces chain slack variation of the chain drive, it greatly limits the ability to improve vehicle dynamics by utilizing different drive chain geometries.

Engine Braking and Reverse Drive Problems:

Spring loaded chain tensioners also have problems with heavy engine braking or reverse drive of the chain drive system. It is well known that a chain drive or belt drive loop has a loaded portion and an unloaded portion, the loaded portion being the length of chain or belt that is in high tension as it pulls on a driven pinion or sprocket to impart rotary motion to a wheel. Typically, a spring loaded tensioner is on the unloaded loose or return side of the chain drive. Under reverse loading, the chain tension switches "sides," and the previously unloaded loose side becomes tight while the formerly loaded portion, the tight side, becomes loose. Under these circumstances, the spring on the tensioner cannot supply a sufficiently large tension force to counterbalance the reverse chain load, and the chain can become very loose and skip or come off the pinions. If the spring tension is increased to compensate for the change in tension due to reverse loading, than the high tension tends quickly to wear the chain drive. Yet another method is to employ an additional spring loaded chain tensioner on the typical tension side of the chain drive. Then, when the chain undergoes a reverse load, this additional chain tensioner adjusts the now loose side of the chain. Such additional spring loaded tensioners add cost and complexity to vehicle configuration. Further, the chain drive tends to exhibit undesirable "slack deadband," in which the driven pinion can rotate back and forth tightening and loosening the different sides of the chain drive relative to the driven pinion.

Previous efforts to statically or dynamically adjust chain tension are disclosed in U.S. Pat. No. 4,705,494 to Gibson; U.S. Pat. No. 4,299,582 to Leitner; U.S. Patent App. Pub. No. 2009/0241742 to Gilgallon et al.; U.S. Pat. No. 4,034,821 to Stoddard et al.; U.S. Pat. No. 3,834,246 to McGilp; and U.S. Pat. No. 4,433,747 to Offenstadt. While the teachings of these patent publications are incorporated herein by reference, any discussion of the prior art throughout this disclosure should in no way be considered as an admission that such prior art is widely known or forms part of common general knowledge in the field.

In sum, there are several main problems with prior art chain adjusting systems, including:
1. Static driveline adjustment requires movement of critical vehicle components, which must be properly aligned for driveline functioning and vehicle functioning;
2. Static driveline adjustment requires loosening of critical vehicle components which must be done with the vehicle stopped and usually on a stand;
3. Static adjustment is labor intensive and inconvenient;
4. Improper chain adjustment can damage driveline components such as the chain, the pinions or the pinion shaft bearings;
5. Final drive geometry is designed around limiting variations in chain path length during suspension travel, instead of improved vehicle dynamics;
6. Final drive dynamic compensation systems tend only to work in one direction of chain tension (forward drive);
7. A spring loaded tensioner would require high spring load to tension the chain during engine braking, or reverse drive; this added tension would reduce the efficiency and life of the drive chain.

There is an unmet need for an improved final drive tensioning system which ameliorates or eliminates these problems. Against the foregoing background, the following invention was developed.

SUMMARY OF THE INVENTION
(DISCLOSURE OF THE INVENTION)

For purposes of cursive description only, the invention may be summarized as an improved final drive chain adjuster system and apparatus which overcomes the problems associated with the prior art. The final drive chain adjuster disclosed hereby provides an improved final drive chain path length compensation system using a chain idler which is moved in a prescribed geometry by a stiff system. The stiff system according to this disclosure keeps constant the chain path length over the range of suspension travel. A chain idler arm assembly guides the chain idler along an arc shaped path with the displacement along this path determined by a cam which is rotated by the vehicle trailing arm. This chain idler arm assembly allows for a simple and convenient static adjustment to compensate the chain path length for wear of components and tolerances in the vehicle assembly.

According to the present system and apparatus, the vehicle trailing arm and driven wheel geometry do not require relative movement for static chain adjustment. Accordingly, the structures that locate them can be stiff, strong and can accurately position these critical components. The disclosed system and apparatus allows for a wide range of adjustment, thereby to allow for final drive geometries designed specially for improved vehicle dynamics (at the expense of variations in distances between the driving and driven pinions of the final drive). In addition, the system allows for long travel suspensions, and can handle a large amount of chain slack or path length variation. Because the chain adjust idler according to this system and apparatus is moved in a prescribed geometry by a stiff system, the variation in the power flow or the direction of power flow through the chain drive has little affect on the path length of the final drive. This allows the system advantageously to control chain slack in both the forward as well as the reverse directions, without adding high levels of tension or chain preload.

Furthermore, it is an object of this application to illustrate embodiments and broadly state the methodologies that may be used in order to apply the information presented here to a wide range of vehicles of both single track as well as multi track driven axles.

Accordingly, several advantages of the present improved final drive chain adjuster are:
1. Allow chain adjustment without movement of any major vehicle component;
2. Allow chain adjustment to be made quickly under a variety of vehicle conditions;
3. Improve the method for chain adjustment to make it easy, clean and convenient;
4. Reduce the possibility of damage to the driveline from improper chain adjustment;
5. Make the chain adjustment more robust with a wider range of adjustment so that final drive geometries can be used which optimized vehicle dynamics with less regard to variation in chain path length over suspension motion;
6. Make the chain adjustment control chain path length for both forward and reverse chain tensions;
7. Make the chain adjuster require little or no added tension to control the chain during engine braking or reverse drive.

Other features and advantages of the invention will become apparent to those skilled in the art upon review of the following detailed description, and drawings.

BRIEF DESCRIPTION OF THE SEVERAL
VIEWS OF THE DRAWING

The accompanying drawings, which are incorporated into and form a part of the specification, illustrate several embodiments of the present invention and, together with the description, serve to explain the principles of the invention. The drawings are only for the purpose of illustrating a preferred or alternative embodiments of the invention and are not to be construed as limiting the invention. In the drawings:

FIG. 1B is an upper rear perspective view of a narrow leaning commuter vehicle with an improved final drive chain adjuster system according to the present disclosure;

FIG. 3A is a perspective view of an improved final drive chain adjuster with an off-set adjust cam assembly;

FIG. 3B is an exploded view of the improved final drive chain adjuster with an off-set adjust cam assembly seen in FIG. 3A;

FIG. 6 is a block diagram of an automatic static adjustment control logic useable in an embodiment of the present invention;

FIG. 8 is a graph showing automatic static adjustment screw torque as a function of screw displacement for an improved final drive chain adjuster with overload protection;

FIG. 10 is a block diagram of an automatic static adjustment control logic useable in an alternative embodiment of the present invention;

FIG. 21 is a perspective view of two chain idle rollers, one with and one without vibration absorbing capability;

Figures 22, 23A:
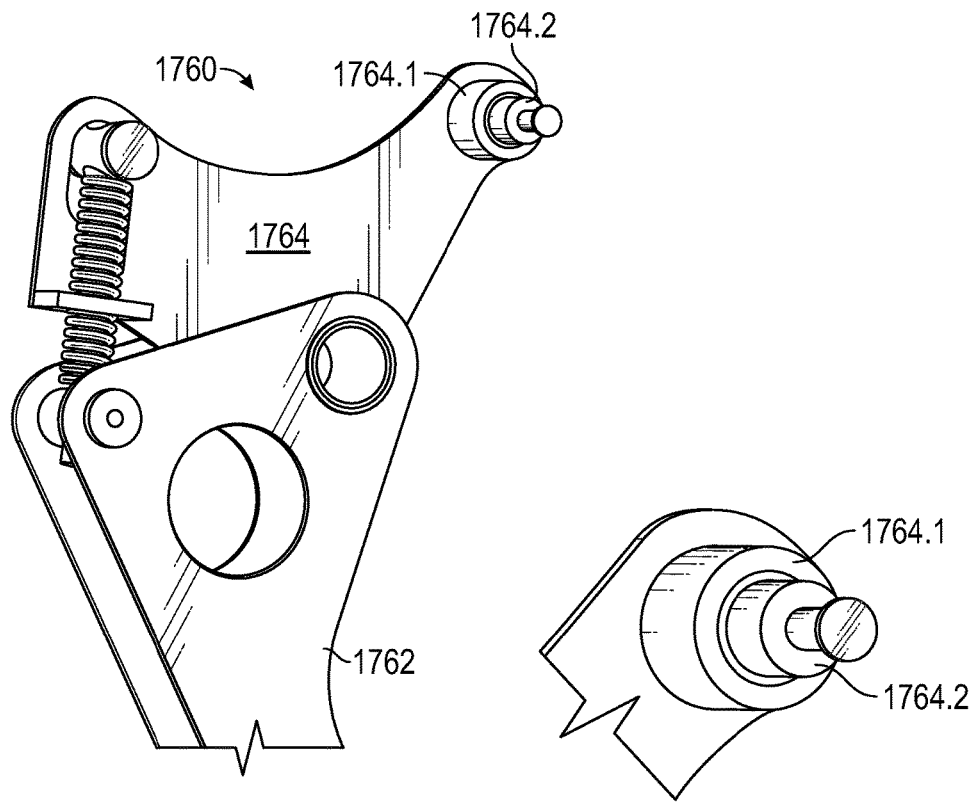
FIG. 22 is a perspective view of components of an adjustment arm assembly having a vibration absorbing cam roller and adjustment barrel.
Figures 23B, 23C:
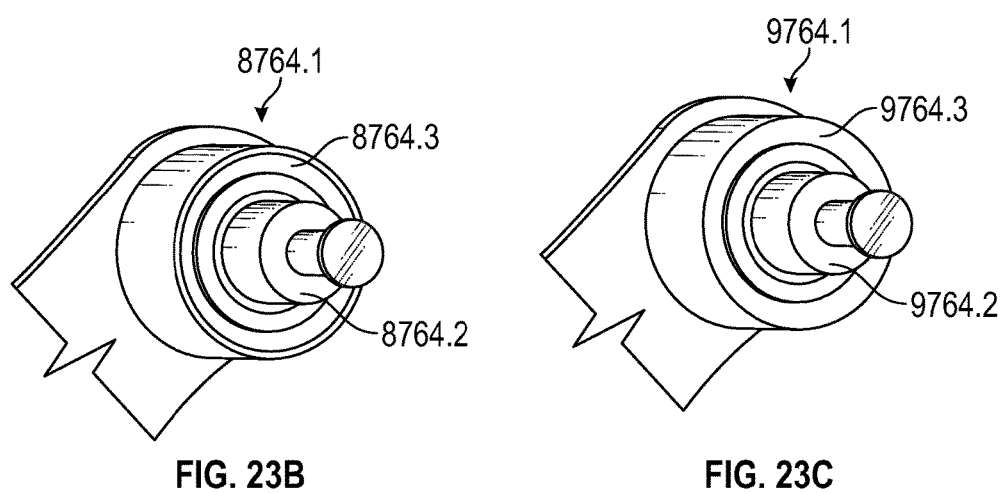
Figure 24B:
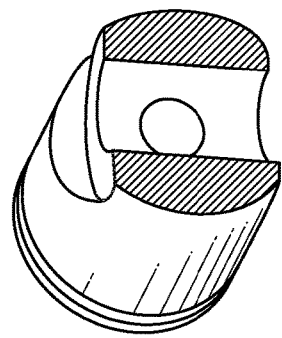
Figure 25B:
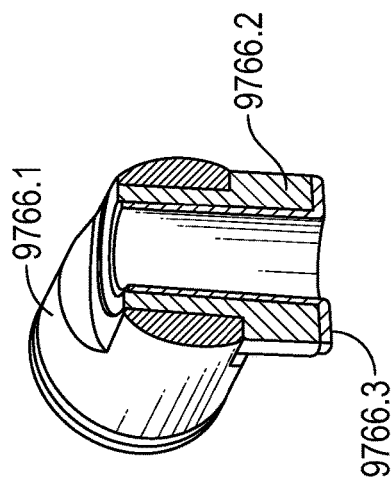
Figure 24A:
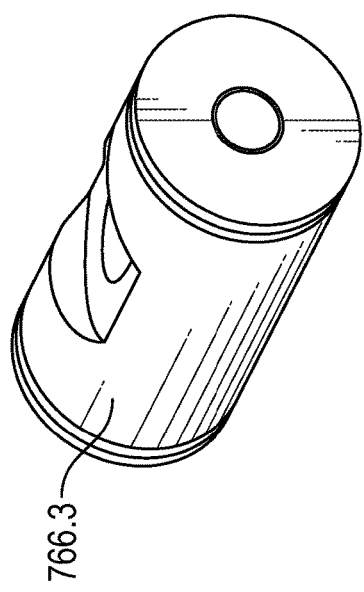
Figure 25A:
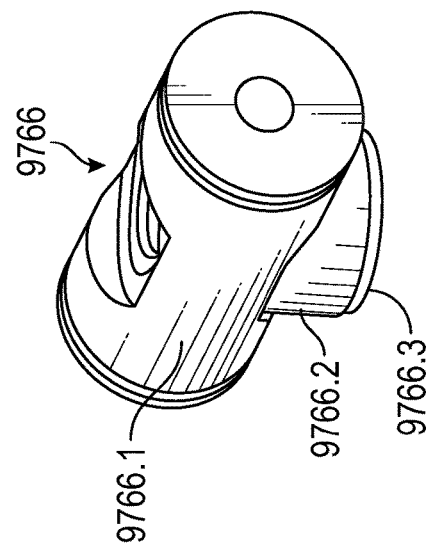

FIGS. 23A-C are enlarged perspective views of alternative versions of the chain take-up cam arm of the adjustment arm assembly seen in FIG. 22;

FIG. 24A is an enlarged perspective view of a chain take-up adjustment barrel with lock according an embodiment of the apparatus of the present disclosure;

FIG. 24B is a cross sectional view of the chain take-up adjustment barrel depicted in FIG. 24A;

FIG. 25A is an enlarged perspective view of an isolated chain take-up adjustment barrel according to an embodiment of the apparatus of the present disclosure;

FIG. 25B is a cross sectional view of the isolated chain take-up adjustment barrel depicted in FIG. 25A; and The Figure of Table 1 is a partial list of the embodiments discussed in this application plus other embodiments which haven't been discussed but based on the discussed embodiments can be inferred based on the method and understanding provided by this application. The Table 1 is sectioned and depicted into five parts for clarity.

A short list of the elements of each embodiment is given in the description section of each embodiment. Similar label numbers identify similar elements and components throughout the several views.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION OF THE INVENTION

Overview and Description of a Nominal Example Vehicle

There is disclosed the structure, functionality and operation of the various components and assemblies of the invention. The improved final drive chain adjuster according to this disclosure is a subsystem which is installed in and functions with a vehicle, such as but not necessarily a motorcycle. However, the subsystem finds utility also on, for example, a three-wheel "multi-track" vehicle. To place the improved final drive chain adjuster in context, an example nominal vehicle will be used for purposes of disclosure. Although this vehicle is used, it should be noted that the improved final drive chain adjuster can work on a wide variety of vehicles which use a trailing arm suspension on driven wheels which use a chain drive type of power transmission.

Figure 1A:
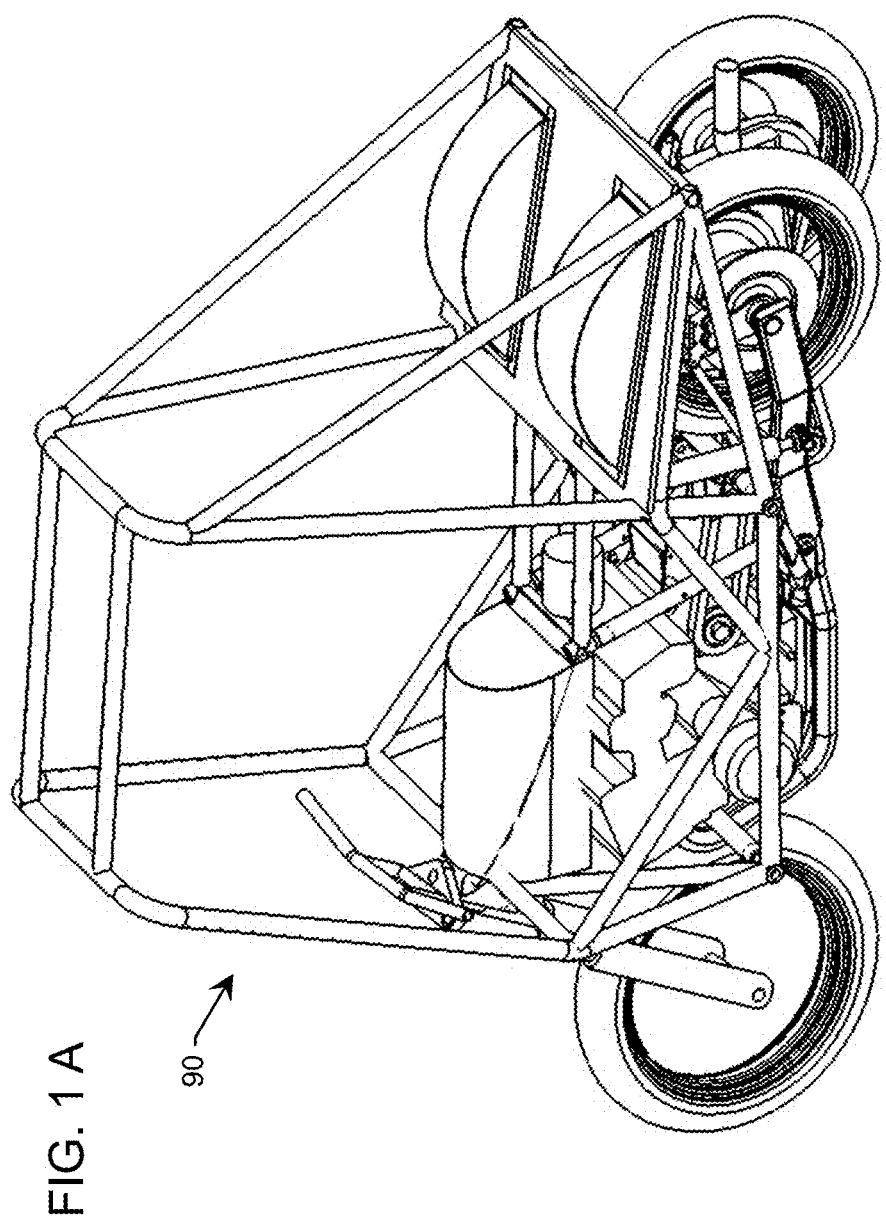
FIG. 1A is a rear perspective view of a narrow leaning commuter vehicle with an improved final drive chain adjuster system.

FIGS. 1A and 1B show a narrow leaning commuter vehicle 90 having three wheels. The vehicle 90 has a steerable front wheel assembly 300, an engine transmission assembly 210, an independent rear suspension structure assembly 500 with a compliance assembly 400, and a final drive assembly 700 for a pair of laterally related rear wheels 550 and 550'. This vehicle arrangement is substantially symmetric about a fore-and-aft vertical plane, with right-hand corresponding parts labeled and referred by primed label numerals. Although a motorcycle type front steerable front wheel assembly 300 is shown, other types of steerable front wheel assemblies could be used with one or two steerable wheels.

The rear wheels 550 and 550' can rise and fall separately as shown in FIGS. 1A and 1B, by means of the following arrangement. The rear wheels 550 are mounted on respective trailing arms 510, which have their trailing arm pivots 512 at the forward ends supporting them and connecting them to the vehicle chassis. The rear wheels 550 are revolutely mounted, to the rear, on the trailing arms 510, generally according to convention. This allows the rear wheels 550 to spin in a vehicle vertical plane, while also allowing the wheel end of the trailing arm 510 also to move in a vehicle vertical plane. This vertical plane is referenced to the vehicle; when the vehicle leans, the vehicle vertical plane leans with the vehicle. Rear suspension compliance assembly 400, heave spring assembly 450, and struts 412 in the rear suspension allow the vehicle to roll while providing support in the heave direction. This allows further the narrow leaning commuter vehicle 90 to have motorcycle dynamics while moving.

A lockable ARB (anti roll bar) assembly 480 is provided so that the rear suspension can become stiffer in a roll direction while the vehicle is stopped or moving slowly. This arrangement requires large suspension wheel travel for the vehicle to have much lean angle; for example if the vehicle leans 45°, then the wheel travel required is equal to or greater than the track width of this multi-track vehicle. Due to these large wheel travels, the rear suspension needs to have excellent anti-squat properties. Moreover, the drive chain path length cannot vary greatly over this large wheel travel; otherwise, the chain could skip or derail.

Figure 1C:
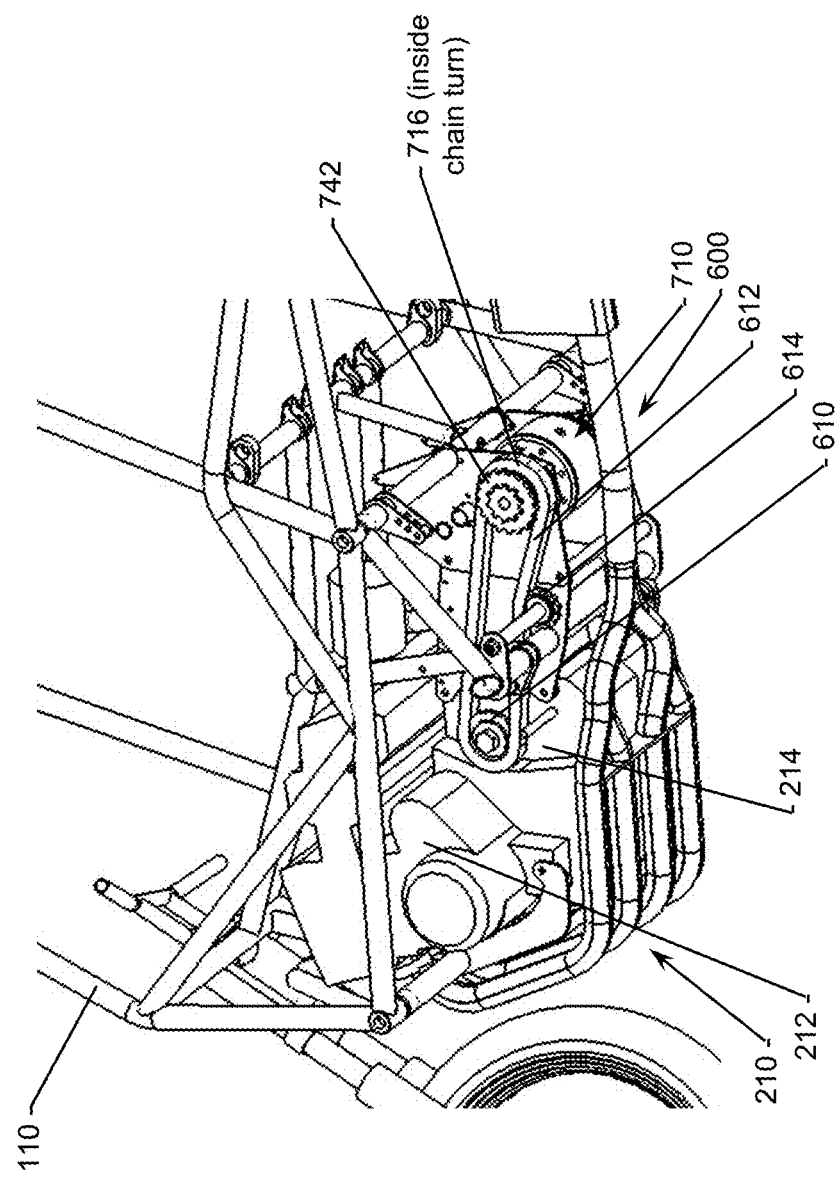
FIG. 1C is a lower rear perspective view of an engine-transmission-differential assembly in a chassis of a narrow leaning commuter vehicle.

FIG. 1C shows details of a vehicle chassis structure 110, including the engine 212, and the transmission 214 along with the intermediate drive 600 and a differential 710 generally according to known principles. The engine-transmission assembly 210 shown in FIG. 1C shares a common case, making it a single assembly. An engine and separate transmission also could be used. The intermediate drive 600 couples an intermediate driving pinion 610 to a differential intermediate driven pinion 716 by means of an intermediate drive chain 612. The intermediate drive chain 612 can be statically adjusted by an intermediate drive adjustable idler 614. The engine 212, transmission 214, intermediate drive 600 and differential 710 could all be integrated together in a single case resulting in a lighter, stronger and stiffer assembly. By these components, the engine 212 can transmit power through the transmission 214 and to the differential 710. The differential 710 provides equal torque to its two final driving pinions 742 and 742'. The equal torques are provided at different output speeds which average to the input differential speed as common with open-type automotive differentials.

The components of the nominal example vehicle 90 which will interact with the improved final drive chain adjuster according to this disclosure are, for the left side of the vehicle, the final driving pinion 742, the rear wheel driven pinion 558, final loop drive element 744, trailing arm 510, and the lockable ARB assembly 480, all shown in FIGS. 2C and 2D. "Mirror" components are on the right side of the vehicle. For clarity, the left side of the vehicle will be discussed in detail; components on the right side are configured and function substantially similarly. The characteristics of these elements which interact with the improved final drive chain adjuster are: 1) that the distance between the final driving pinions 742, 742' and the rear wheel driven pinions 558, 558' vary depending on the positions of their corresponding trailing arms 510, 510', and 2) that the left side of the lockable ARB assembly 480 rotates proportionally with the trailing arm 510; the proportional rotation of the ARB assembly 480 is defined by the position of a trailing arm ARB tiered mount 496 and the length and angle of the ARB fixed arm 492, as seen in FIGS. 2C and 2D. (Because of symmetry, both ARB fixed arm 492 and the ARB floating arm 493 have the same length). ARB tie rods 494, 494' connect ARB arms 492, 493 to their corresponding trailing arms 590, 510' via their respective tiered mounts on the trailing arms. It is noted that the final drive elements' final driving pinion 742, rear wheel driven pinion 558, and final loop drive element 744 are required to all be substantially coplanar, as is typical for a typical drive system. In this disclosure, it is assumed and preferred that the elements of the inventive improved final drive chain adjuster are also in this same plane, although other components besides the chain take up idler are not necessarily in this plane for proper functioning. The loop drive element 744 has, according to convention, a loaded portion and an unloaded portion, the loaded portion typically being the "upper" side of the loop in tension when the vehicle is being driven forward. There is a loop drive idler assembly of the invention engagable with the loop drive element, and a loop drive path is defined around the driving pinion, the driven pinion and the loop drive idler assembly; the effective length of the path is regulated by the variable position of the idler assembly. A loop drive idler assembly position determined by movement of a take-up cam, as shall be described herein.

Detailed Description of a First Embodiment

Here is a listing of the components and their drawing figure label numerals for a first embodiment of the improved final drive chain adjuster:

760 Chain Length Take-Up 760
762 Chain take-up idler arm assembly 762
762.1 Chain take-up idler arm with tube 762.1
762.2 Chain take-up idler arm with nut 762.2
762.3 Chain take-up idler arm bushing 762.3
762.4 Chain take-up idler arm spacer 762.4
762.5 Chain take-up idler arm bolt 762.5
762.6 Chain take-up idler arm nut 762.6
763 Chain take-up idler assembly 763
763.1 idle roller 763.1
763.2 hat bushing 763.2
763.3 bolt 763.3
764 Chain take-up cam arm assembly 764
764.1 Chain take-up cam arm 764.1
764.2 Chain take-up cam follower 764.2

764.3 Chain take-up cam follower fastener 764.3
764.4 Chain take-up cam follower nut 764.4
766 Chain take-up adjustment assembly 766
766.1 Chain take-up adjustment screw 766.1
766.2 Chain take-up adjustment screw lock 766.2
766.3 Chain take-up adjustment barrel with lock 766.3
766.4 Chain take-up adjustment threaded barrel 766.4
766.5 Chain take-up adjustment preload spring 766.5
768 Chain take-up cam 768
772 Chain take-up pivot 772
773 Chain take-up pivot collar 773
775 Chain take-up pivot support 775

Figure 2A:
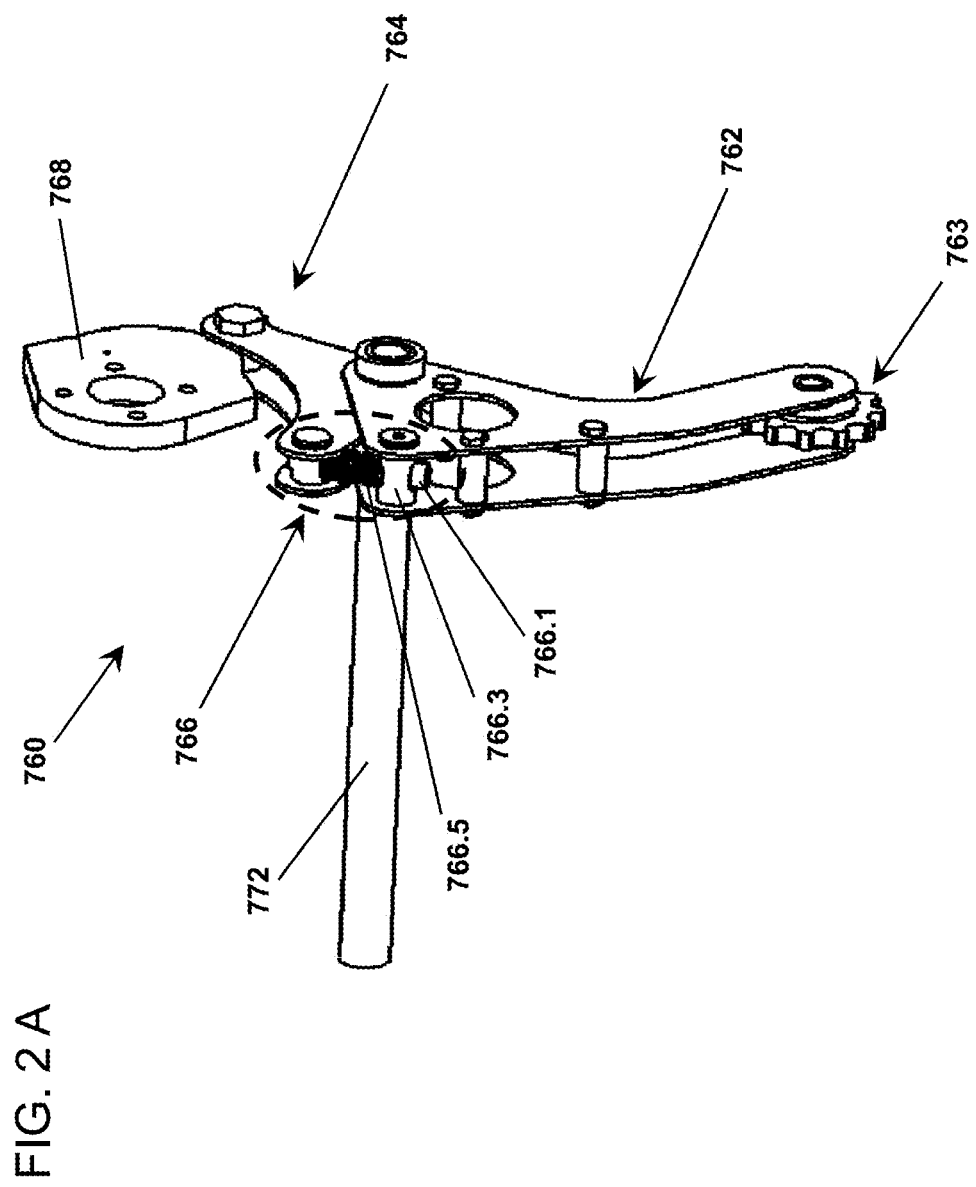
FIG. 2A is a perspective view of a first preferred embodiment of the improved final drive chain adjuster according to the present disclosure.

Combined reference is made to FIGS. 2A through 2F detailing a first improved final drive chain adjuster, also called hereinafter the chain length take-up 760. Description of this first embodiment in detail serves also to describe many of the aspects, features, and functions of the various other alternative embodiments. The chain length take-up 760 has four main component assemblies: an idler arm assembly 762, a cam arm assembly 764, a take-up cam 768, and an adjustment assembly 766. The cam arm assembly 762 and the idler arm assembly together cooperatively constitute a take-up arm assembly for transferring motive forces from the cam 768 to the idle roller 763.1 of the take-up idler assembly. Referring to FIG. 2F, there is seen the trailing swing arm of the motorcycle, which is pivotally mounted (by trailing arm pivot 512, FIG. 2C) to the motorcycle's main frame so as to trail from the rear of the main chassis. The rear wheel of the motorcycle is rotatably mounted inside the fork of the trailing swing arm according to convention. (Only the left side of the trailing swing arm, and the leading edge of the wheel/tire, are seen in FIG. 2F.) Also seen (but unlabeled) in FIG. 2F is a comparatively large is hydraulic/gas damper spring assembly vertically mounted between one side of the swing arm and the main frame of the vehicle.

A take-up idler assembly 763 (with idle roller 763.1) is rotatably disposed on the lower end of the idler arm 762.1. The idler roller 763.1 (e.g. a gear or pulley) on the assembly 763 engages with the final loop drive element 744 (part seen, but not labeled, in FIG. 2F) that wraps around the driven pinion 558 on, or operatively associated with, the rear wheel.

Seen in FIG. 2F is an ARB arm 492. The arm 492 is indirectly but operatively connected to the cam 768, such that when the arm 492 moves (i.e., pivots in relation to the axis about which the cam 768 also pivots), the cam automatically moves correspondingly. Stated differently, pivotal movement (either clockwise or counterclockwise) of the arm 492 induces concurrently an equal-angular pivotal movement of the cam 768. The cam 786 can pivot on or with an ARB bar 482 of the assembly 480; the bar 482 is unlabelled in FIG. 2F, but is coaxial with the axis of ration of the cam 768.

Referring still to FIG. 2F, there is seen a tie rod 494 (FIG. 2C) that extends between trailing arm 510 and the arm 492. The tie rod 494 is pivotally connected to both the ARB arm 492 and the trailing arm 510. It is seen, therefore, that pivoting "up and down" movement of the trailing arm (as when the vehicle's rear wheel 550 is moving up and down over a bump on the road) is translated, via the tie rod 494, from the trailing arm to the ARB arm 492.

Figure 2B:
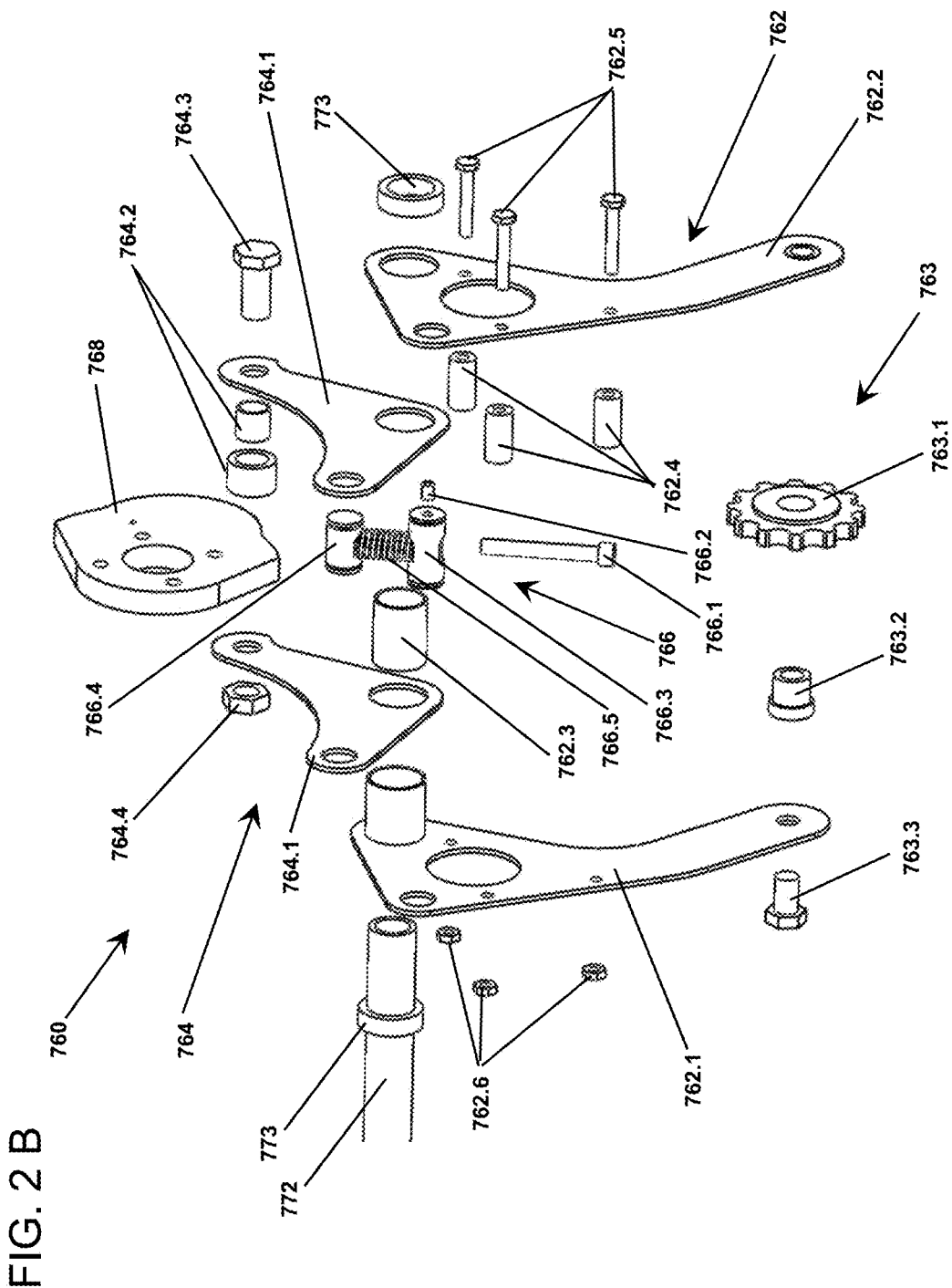
FIG. 2B is an exploded view of the improved final drive chain adjuster seen in FIG. 2A.

Combined reference is made to FIGS. 2A, 2B and 2F. The idler arm assembly 762 and the cam arm assembly 764 are both pivotally disposed on the take-up pivot 772, which is on the vehicle and preferably fixed in relation to the vehicle's frame. In this embodiment, the idler arm assembly 762 and the cam arm assembly 764 are adjacent and radially aligned with each other on the take-up pivot, in the sense that they share substantially the same virtual plane of rotation relative to the axis of the take-up pivot 772. As seen in FIGS. 2A and 2B, the idler arm assembly 762 and the cam arm assembly 764 are installed upon the pivot 772 such that the two take-up cam arms 764.1 are sandwiched between the idler arm with tube 762.1 and the idler arm with nut 762.2, with the take-up cam arms 764.1 pivotal around the tube of the idler arm with tube 762.1. The two arm assemblies 762, 764 share a common axis of rotation (pivotal axis) defined by the axis of the take-up pivot 772; they are capable of rotating around the pivot 772 independently of each other, but ordinarily do not because they normally are interconnected by the adjustment assembly 766. Thus in the dynamic operation of the invention, the cam arm assembly 764 and the idler arm assembly 762 rotate together, that is, they pivot as though they were a single unit around the axis defined by the take-up pivot 772. However, the adjustment assembly 766 can be manipulated to alter the relative "static" positions of the two arm assemblies 762, 764, and thus serves as a means for adjusting the variable angular relationship of the take-up idler arm assembly and the cam arm assembly (relative to each other) on the pivot 772.

The cam arm assembly 764 includes a rotatable follower 764.2, the follower being a wheel that "rides" against and along the cam surface of the cam 768. During operation, tension in the loop drive element 744 provides that the follower 764.2 is always in rolling contact with the cam 768.

The adjustment assembly 766 extends between two respective arms of the idler arm assembly 762 and the cam arm assembly 764. The adjustment assembly 766 is comprised mainly of two barrel connectors, one which connects to the cam arm 764.1 and the other which connects to the idler arm 762.1. A take-up adjustment screw 766.1 slides through the lower adjustment barrel with lock 766.3, and is screwably engaged into the upper take-up adjustment threaded barrel 766.4; a user's controlled turning of the adjustment screw 766.1 in either direction (with, or against, the bias of an adjustment preload spring 766.5) adjusts the angular position of the cam arm 764.1 relative to the idler arm 762.1. Thus, the user of the invention can rotate (as with a small wrench or screwdriver) the adjustment screw 766.1 to perform a "static" adjustment of the tension in the vehicle's loop drive element 744; shortening the distance between the two connector barrels 766.3 and 766.4 moves the idler assembly 763 forward (toward the left in FIG. 2F) to tighten the loop drive element 744. Lengthening the distance between the barrels 766.4, 766.3 "loosens" the chain by moving the idler assembly 763 rearward, toward the rear wheel axis. Note that because the follower 764.2 always abuts the cam 768, adjusting the effective length of the adjustment assembly 766 shifts the angular position of the idler arm 762.1, thus rotating the idler assembly 763 relative to the take-up pivot 772, which in turn adjusts the tension the idler assembly 763 applies to the loop drive element 744.

An important aspect of the apparatus and subsystem is that the chain length take-up assembly 760 provides active, "dynamic," drive chain tension adjustment automatically in response to pivotal movement of the motorcycle's trailing arm 510. For example, suppose the rear wheel 550 passes over a sharp bump. The axle assembly 560 of the rear wheel moves upward, and the trailing arm pivots up in relation to the vehicle's chassis. The upward pivotal movement of the trailing arm 510 is translated, via the tie rod 494, instantly to the upper ARB arm 492. The arm 492 rotates (counterclockwise in FIG. 2F) in response to the force from the tie rod 494; the rotation of the ARB arm 492 automatically and instantly imparts counterclockwise rotary motion to the cam 768 (as these two elements rotate together about the common axis seen in the general center of the cam 768 in FIG. 2F). The pivoting of the cam 768 in turn imparts movement to the follower 764.2 on the upper part of the cam arm assembly 764. Thus, the follower 764.2 rolls along the cam surface of the moving cam 768; the irregular shape of the cam surface shifts the absolute position of the follower 764.2 in space (or at least with reference to the vehicle chassis), which in turn automatically pivots (i.e. clockwise in FIG. 2F) the entire cam arm assembly 764 about the axis defined by the take-up pivot 772. Such pivoting movement of the cam arm assembly 764 automatically causes the idler arm assembly 762 to pivot clockwise as well, as the two arms have a common axis of rotation at take-up pivot 722, and are also joined by the adjustment assembly 766. Clockwise rotation of the idler arm assembly 762 moves the idler assembly 763 a short distance further way from the rear wheel axle assembly 560, thus increasing (temporarily but automatically) the tension in the vehicle's final loop drive element 744. When the main trailing arm 510 pivots back down after the road bump (and under the action of the rear wheel's main suspension assembly), the actions and movements of the component train of the chain length take-up assembly 760 are reversed, rapidly and automatically providing a slight reduction in the tension in the loop drive element 744. It is observed that the overall operation of the chain length take-up assembly 760 is by an active cam action, rather than by the extension/compression of any spring within the assembly 760.

Attention is invited to FIGS. 2A and 2B for additional details. FIG. 2A presents the left (perspective) side view of the improved final drive chain adjuster 760 (again, also called herein a chain length take-up), while FIG. 2B is an exploded view. The improved final drive chain adjuster 760 is made up of six main components (starting from the top of FIG. 2A and working down): the chain take-up cam 768, the chain take-up cam arm assembly 764, the chain take-up adjustment assembly 766, the chain take-up pivot 772, the chain take-up idler arm assembly 762, and the chain take-up idler 763. The chain take-up cam 768 is a flat plate with a cam-shaped profile on one section, and a hole in the approximate center. Cam 768 also has mounting holes or some other mounting provision. The chain take-up cam 768 is mounted onto the lockable ARB assembly 480 (FIGS. 2C and 2D) and is in the chain drive plane. The chain take-up cam 768 rotates with the lockable ARB assembly 480, which is in direct proportion to a motion of the trailing arm 510. The chain take-up cam 768 is constructed with the cam profile having been calculated to move the chain take-up idler assembly 763 the correctly corresponding amount for constant chain path length as the trailing arm 510 and chain take-up cam 768 rotate. The precise cam profile depends upon the configuration of, and components dimensions, the vehicle upon which the drive chain adjuster 760 is to be used, but can be determined from known methods. The chain take-up cam 768 imparts the motion via the chain take-up cam arm assembly 764.

The chain take-up cam arm assembly 764 is roughly triangular shaped with a pivot at its center vertex. It pivots about the chain take-up pivot 772, which has an axis parallel to that of the trailing arm pivot 512, and to the spin axis of the rear wheel 550. The chain take-up cam arm assembly 764 has a chain take-up cam follower 764.2 at its second vertex, which follower rolls against the chain take-up cam 768, and thus defining the rotation of the chain take-up cam arm assembly 764. A first end of the chain take-up adjustment assembly 766 is pivotally mounted at the third vertex of the cam arm assembly 764.

Also pivoting about the chain take-up pivot 772, nested with the chain take-up cam arm assembly 764, is the chain take-up idler arm assembly 762. The chain take-up idler arm assembly 762 has an elongated, somewhat isosceles, triangular shape. Idler arm assembly 762 has a pivot on a short vertex thereof, and picks up the other, second, end of the chain take-up adjustment assembly 766 with a pivotal connection at its other short vertex. On the long vertex of the chain take-up idler arm assembly 762 is mounted the chain take-up idler assembly 763. The chain take-up adjustment assembly 766 allows the relative positional adjustment between the chain take-up cam arm assembly 764 and the chain take-up idler arm assembly 762. The chain take-up cam arm assembly 764, chain take-up idler arm assembly 762, chain take-up idler assembly 763, and the chain take-up adjustment assembly 766 are preferably all in the plane of the chain drive.

Figure 2:
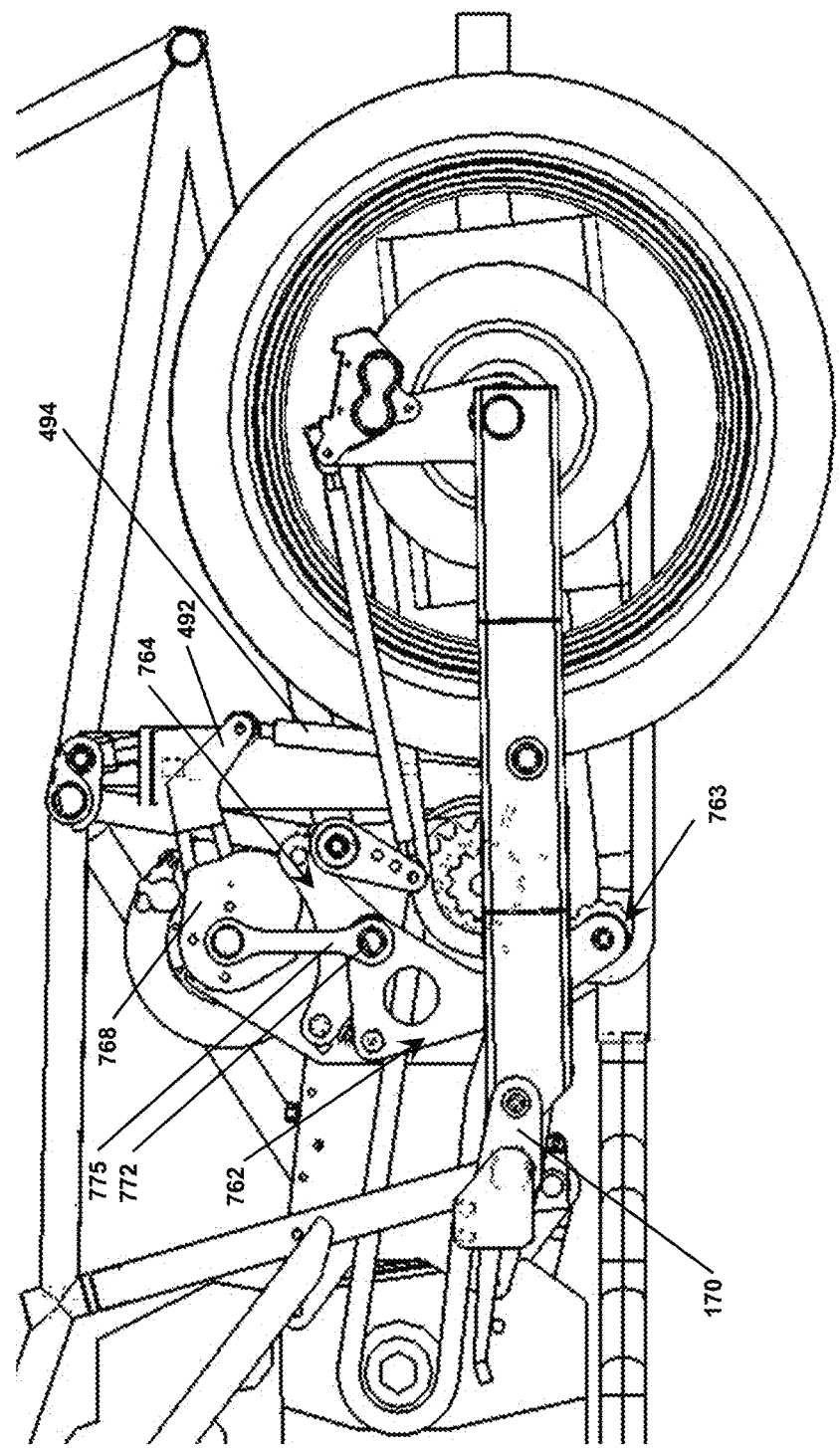
FIG. 2C is a perspective view of a rear suspension, anti roll bar (ARB), and final drive of a commuter vehicle with an improved final drive chain adjuster system according to the present disclosure.
FIG. 2D is a side view of a rear suspension, anti roll bar, and final drive of a commuter vehicle with an improved final drive chain adjuster system according to the present disclosure.
FIG. 2E is a partial side view of a vehicle showing rear suspension and drive system and an improved final drive chain adjuster system according to the present disclosure installed upon the vehicle.
FIG. 2F is an enlarged side view showing detail of a sectioned preferred embodiment of the chain adjuster system installed upon a vehicle, with the take-up arm being a take-up idler arm and a take-up cam arm.
FIG. 2G is a graph depicting static adjustment screw torque as a function of screw displacement for an embodiment of the present invention.
Figure 2:
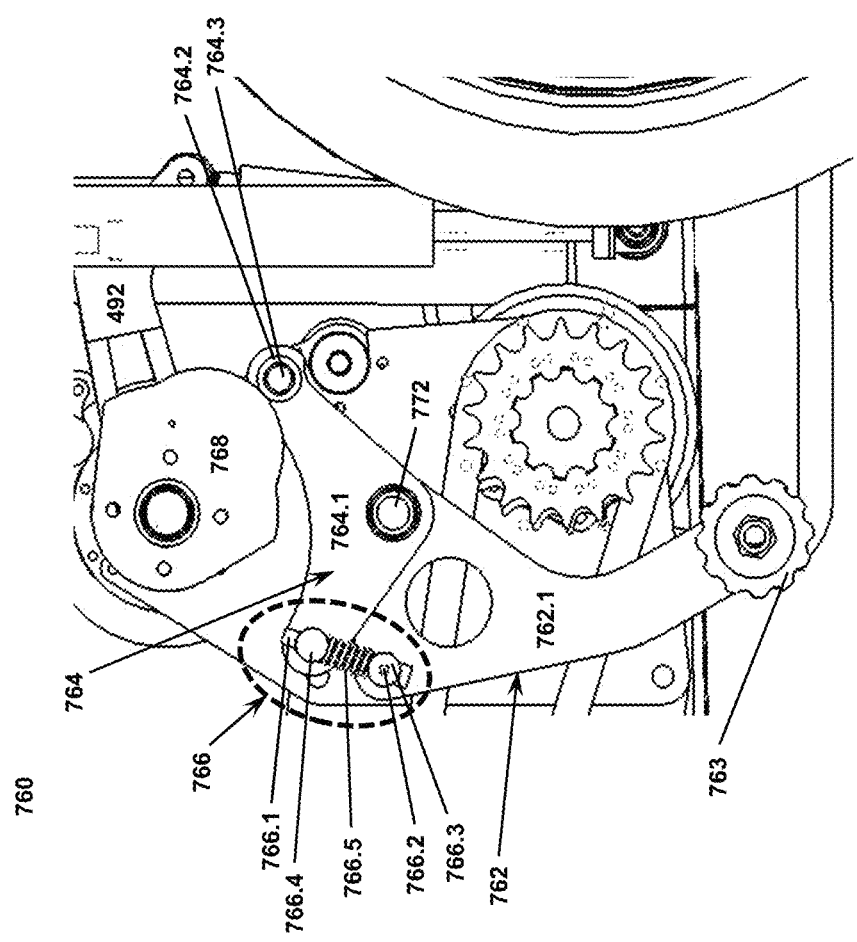

FIG. 2 B provides yet more detailed description of the various components of the drive chain adjuster 760. The chain take-up idler arm assembly 762 is predominately fashioned from two sheet steel arms, namely chain take-up idler arm with tube 762.1, and chain take-up idler arm with nut 762.2. Chain take-up idler arm with tube 762.1 has a tube therewith which acts as the pivot welded to the flat steel arm; a chain take-up idler arm bushing 762.3 is pressed into this tube. The second arm, chain take-up idler arm with nut 762.2, is bolted to the first arm by three chain take-up idler arm bolts 762.5 and chain take-up idler arm nuts 762.6, with chain take-up idler arm spacers 762.4 situated between the two arm plates. The nut welded onto chain take-up idler arm with nut 762.2 secures a bolt 763.3, in turn holding the chain take-up idler assembly 763 to the chain take-up idler arm assembly 762, with a hat bushing 763.2 for proper spacing. A bearing in idle roller 763.1 allows the idler to rotate. Two steel sheet arms also make up the chain take-up cam arm assembly 764, which mounts just inside the two arm plates of the chain take-up idler arm assembly 762, and about the pivot tube. The chain take-up cam follower 764.2, which is comprised of a fixed inner race and a rotating outer bearing, mounts between these two arms with a chain take-up cam follower fastener 764.3 and chain take-up cam follower nut 764.4 holding the assembly together.

Chain take-up adjustment assembly 766 includes two cylindrical barrels, namely adjustment barrel with lock 766.3 and chain take-up adjustment threaded barrel 766.4. Operatively associated with the adjustment barrel with lock 766.3 and the adjustment threaded barrel 766.4 is an adjusting screw, namely the chain take-up adjustment screw 766.1, as well as a chain take-up adjustment preload spring 766.5 and a screw lock chain take-up adjustment screw lock 766.2. Compression in the adjustment preload spring 766.5 urges the separation (increase in distance of separation) between the adjustment barrel with lock 766.3 and the adjustment threaded barrel 766.4, which urging is checked and regulated by the adjustment screw 766.1. The chain take-up adjustment threaded barrel 766.4 is revolutely mounted into holes in the chain take-up cam arm assembly 764 (e.g., as with snap rings (not shown)) on the inside of the two plates, thus securing the barrel from sliding axially. The chain take-up adjustment barrel with lock 766.3 is revolutely mounted into holes in the chain take-up idler arm assembly 762 (e.g., with snap rings (not shown)) on the outside of the two plates. The chain take-up adjustment screw 766.1 slides through chain take-up adjustment barrel with lock 766.3, and is threaded into chain take-up adjustment threaded barrel 766.4; chain take-up adjustment preload spring 766.5 is coaxial with chain take-up adjustment screw 766.1, the spring 766.5 and adjustment screw 766.1 thus situated between the two barrels. Chain take-up adjustment screw lock 766.2 threads into the side of chain take-up adjustment barrel with lock 766.3 to secure chain take-up adjustment screw 766.1 from turning once locked. Chain take-up pivot 772 is tube shaped and mounts into the vehicle chassis 110. Chain take-up pivot 772 laterally locates chain take-up idler arm assembly 762 and chain take-up cam arm assembly 764 using two chain take-up pivot collars 773, one on each side of the arms, but pivot 722 allows the two arm assemblies to rotate.

FIGS. 2C, 2D, 2E and 2F depict the chain length take-up 760 installed on the vehicle 90. The chain take-up pivot 772 is mounted above and just forward of the vehicle's final driving pinion 742. The final loop drive element 744 rides around the chain take-up idler 763, between the two plates of the chain take-up idler arm assembly 762, around the final driving pinions 742, and back around the driven pinion 558, completing the loop at the chain take-up idler 763. The chain take-up pivot support 775 supports the outer end of the chain take-up pivot 772, by fixing its distance to the lockable ARB assembly 480 while also permitting the lockable ARB assembly 480 to rotate independently of the chain take-up pivot support 775. The support 775 helps reduce the cantilever loading on the chain take-up pivot 772.

A static adjustment of the final loop drive element 744 may be made by adjusting the chain take-up adjustment screw 766.1. When the threaded adjustment screw 766.1 is rotated to pull the two adjustment barrels 766.3 and 766.4 closer together to decease the separation distance between them, the chain take-up idler assembly 763 is moved forward (i.e., toward the left in FIGS. 2C-2E), thereby lengthening the effective chain path length and tightening (increasing tension in) the final loop drive element 744. This tightening occurs because the chain take-up cam assembly 768 pushes against the chain take-up cam arm assembly 764, preventing it from rotating during the static adjustment. After the adjustment has been made, the threaded chain take-up adjustment screw lock 766.2 is screwed inward in the assembly 766, to the adjustment screw 766.2, thereby to lock the chain take-up adjustment screw 766.1 in axial position thus preventing it from rotating (and changing the chain adjustment). The forgoing subsystem allows for easy, clean and convenient static chain tension adjustment; adjustment does not require moving the rear wheel 550 relative to the trailing arm 510, or the trailing arm 510 relative to the chassis 110. Critical wheel alignment remains unaffected.

A mode of dynamic drive loop element adjustment is explained. As the wheel 550 and associated suspension compress and extend as a result of the vehicle 90 hitting bumps or leaning, the trailing arm movement is transmitted to the chain take-up cam assembly 768 by the ARB rod 482, via the ARB arms 492 (left side) and 493 (right side) and the respective ARB tie-rods 494. As a trailing arm 510 moves up or down, it correspondingly moves the tie-rod 494, the bottom end of which is pivotally connected to the trailing arm. Such movement of the tie-rod 494 is transmitted to the cam 768 by the pivoting movement of the ARB arm 492 which is pivotally connected to the top end of the tie-rod. The pivotal movement of the cam 768 in turn is immediately transmitted, by the action of the follower 764.2 rolling along the eccentric cam profile of the cam 768, and via the resulting pivoting of the cam arm assembly 764 and idler arm assembly 762 (which rotate together around the take-up pivot 772), to the take-up idler 763. The chain take-up cam 768 is shaped in profile such that the chain take-up idler assembly 763 is properly positioned to regulate for a constant final drive chain loop path length as the rear wheel 550 moves up and down with the trailing arm 510. Consequently, the effective chain path length is held substantially constant throughout the long suspension travel required for a successful leaning or "bumping" vehicle.

This system also permits a wide range of chain path length adjustment, which allows for the final drive driving pinion 742 to be located in an optimal location for improved vehicle dynamics (instead of locating coaxially with the trailing arm pivot 512). The disclosed configurations also result in a chain adjustment system that is stiff, so that reverse final drive loading with high chain tension on the lower, ordinarily loose, chain drive side cannot move the chain idler 763. This is in direct contrast with conventionally known spring loaded chain adjusters, which cannot accommodate reverse chain loading.

In designing a chain adjustment system according to this disclosure, a modern solid modeling program is helpful. Programs such as SolidWorks® software have the ability to simulate the changing geometry of chain and belt drive systems as components are moved. In this system, the geometry can be set, and the trailing arm 510 can be moved through the full range of motion required. The required motion of the chain take-up idler assembly 763 can be determined and then the geometry of the chain take-up cam 768 can be determined. It may be preferable to design the cam geometry based on an average amount of chain and pinion wear, then subsequently check to see if satisfactory chain path length adjustment occurs at the unworn and end-of-life chain conditions. For an optimal system to be designed for a given vehicle application, some iteration may be involved to determine the best ranges of the following factors: anti-squat; trailing arm length; driving, driven pinion and idler sizes; chain take-up idler arm length and geometry, chain take-up cam arm length and geometry and chain take-up cam geometry.

Figure 2G:
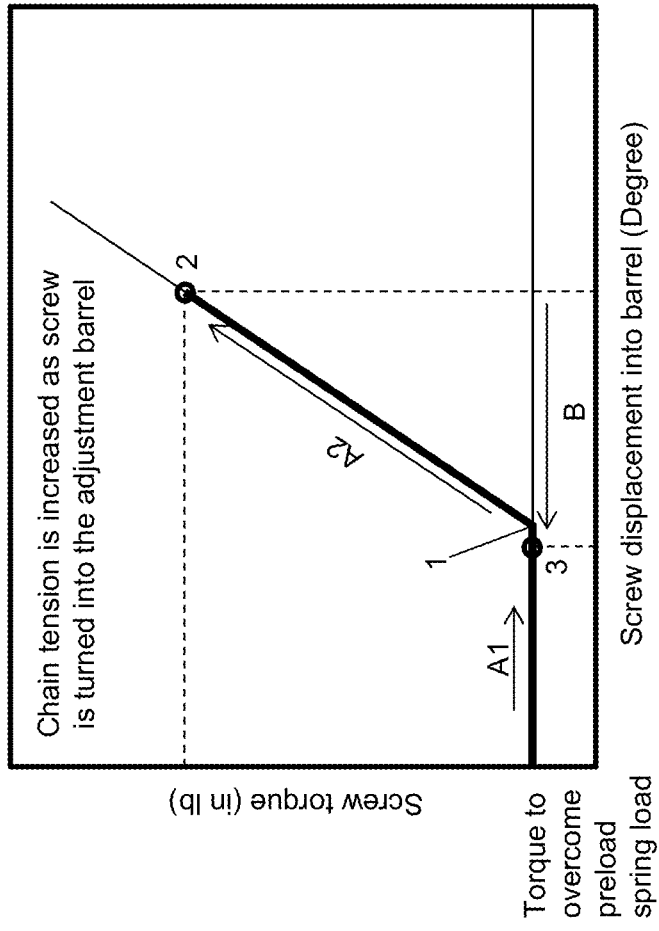

There is offered now additional disclosure regarding the operation of the first embodiment of the invention. FIG. 2G is a graph of the chain take-up adjustment screw 766.1 torque as a function of adjustment screw displacement. With the chain take-up adjustment screw 766.1 extended out of the chain take-up adjustment threaded barrel 766.4, the final loop drive element 744 is loose, and the chain take-up adjustment screw 766.1 needs only to overcome the force of the chain take-up adjustment preload spring 766.5 (which is relatively light as the screw is tightened). This operation is shown by region A1 in FIG. 2G. Once the chain (i.e., loop drive element) slack is taken up, identified by point 1 in the figure, further tightening of chain take-up adjustment screw 766.1 stretches the final loop drive element 744 and flexes the chain adjustment structure—which requires higher screw torque levels for a given change in screw displacement, as indicated by line A2 in FIG. 2G. For a static tension adjustment, the chain take-up adjustment screw 766.1 is tightened to a given torque value identified by point 2 on the graph. The chain take-up adjustment screw 766.1 is then backed out a given displacement to point 3, indicated by line B in FIG. 2G. Both the given peak torque (point 2) and the given reward screw displacement are functions of the final drive element type (chain belt etc.) and vehicle application. The static chain adjustment does not require the suspension to be at any particular height, because the chain length take-up 760 automatically accounts for any change in distance between the rear wheel driven pinion 558 and the final driving pinions 742, thus simplifying this critical adjustment.

Although mild steel sheet was referred to in the description of chain take-up idler arm assembly 762 and chain take-up cam arm assembly 764, other materials may be used. As the improved final drive chain adjuster 760 is a vehicle subsystem, components of it could be made with any engineering material used on vehicles such as mild steel, alloy steel, various types of aluminum or magnesium, engineered plastics, composite material, or even advanced composite materials such as epoxy carbon fiber for high performance vehicles. Also, almost any manufacturing process used in vehicle manufacture could be used to construct the components of the improved final drive chain adjuster, such as punching, stamping, bending, various casting methods, laser or water jet cutting, machining using a wide variety of machines could be used. Standard joining methods could also be used in the manufacture of the different components such as welding, riveting, bonding, bolting etc.

Detailed Description of a Second Embodiment

Here follows a listing of the components and their drawing figure label numerals for a second embodiment of the improved final drive chain adjuster:
10760 Chain length take-up 10760
10762 Chain take-up idler arm assembly 10762
10762.1 Chain take-up idler arm weldment 10762.1
10762.3 Chain take-up idler arm bushing 10762.3
10762.4 Chain take-up idler arm spacer 10762.4
10762.5 Chain take-up idler arm bolt 10762.5
10762.6 Chain take-up idler arm nut 10762.6
10763 Chain take-up idler assembly 10763
10763.1 idle roller 10763.1
10763.2 hat bushing 10763.2
10763.3 bolt 10763.3
10764 Chain take-up cam arm assembly 10764
10764.1 Chain take-up cam arm weldment 10764.1
10764.2 Chain take-up cam follower 10764.2
10764.3 Chain take-up cam follower fastener 10764.3
10764.4 Chain take-up cam follower nut 10764.4
10766 Chain take-up adjustment assembly 10766
10766.1 Chain take-up adjustment screw 10766.1
10766.2 Chain take-up adjustment screw lock 10766.2
10766.3 Chain take-up adjustment barrel with lock 10766.3
10766.4 Chain take-up adjustment threaded barrel 10766.4
10766.5 Chain take-up adjustment preload spring 10766.5
10768 Chain take-up cam 10768
10772 Chain take-up pivot 10772
10773 Chain take-up pivot collar 10773
10775 Chain take-up pivot support 10775

A second embodiment of the invention according to this disclosure features an offset plane chain drive adjustment. FIG. 3A provides a perspective view of the left side of a second embodiment of the improved final drive chain adjuster, also called a chain length take-up 10760. In some vehicle applications, it may be desirable to have the chain take-up cam 10768 and chain take-up cam arm assembly 10764 out of plane (non-coplanar, but generally parallel) with the other components of the chain drive. In this embodiment, therefore, the idler arm assembly 762 and the cam arm assembly 764 are not radially aligned with each other on the take-up pivot, in the sense that they have differing planes of rotation relative to the axis of the take-up pivot 772; the idler arm assembly 762 and the cam arm assembly 764 are axially offset from each other relative to the axis of rotation defined by the take-up pivot 772. With modest modifications to be described below, this second embodiment functions in a very similar manner, and using substantially the same principles of operation, as the first embodiment disclosed above. In this embodiment, the chain take-up pivot 10772 has been lengthened (compared to the first embodiment), and the chain take-up cam arm assembly 10764 and chain take-up cam 10768 are inwardly offset towards the inside (center) of the vehicle, as illustrated by FIG. 3A. This offset is accomplished (axially along the take-up pivot) with a different chain take-up idler arm assembly 10762, and a different chain take-up cam arm assembly 10764, that have been modified relative to the corresponding assemblies of the first embodiment.

FIG. 3B is an exploded view of this second embodiment of chain length take-up 10760. The main structural body of the chain take-up cam arm assembly 10764 is a chain take-up cam arm weldment 10764.1. The weldment body 10764.1 preferably is a welded structure having two plates welded to a lower pivot bushing tube with a pressed-in bushing for the pivot (10772), and another upper support tube welded in to support a chain take-up adjustment threaded barrel 10766.4 (substantially the same as adjustment threaded barrel 766.4 of the first embodiment). As seen in FIG. 3B, the upper support tube has apertures or slots cut into its wall for receiving there-through the chain take-up adjustment screw 10766.1. The main structure of the chain take-up idler arm assembly 10762 preferably also is a weldment. The chain take-up idler arm weldment 10762.1 which includes two plates welded to a pivot tube which pivot tube has a bushing pressed into it. The bushing slides over the pivot tube of the chain take-up cam arm weldment 10764.1, allowing the chain take-up adjustment assembly 10766 to adjust the angle between the chain take-up idler arm weldment 10762.1 and the chain take-up cam arm assembly 10764, to adjust their relative angular positions (upon axis defined by the pivot 10772), in a manner similar to the first embodiment. A collar 10733 may be provided as a stop against excess axial movement of the chain length take-up 10760 upon the take-up pivot 10772. Besides the offset between the two arm assemblies 10762 and 10764, this second embodiment functions and operates in a fashion similar to the first embodiment.

Detailed Description of a Third Embodiment

Here follows a listing of the components and their drawing figure label numerals for a third embodiment of the improved final drive chain adjuster:
1170 Automatic Chain static adjuster 1170
1175 Automatic static chain adjustment assembly 1175
1175.1 housing 1175.1
1175.2 adjustment screw 1175.2
1175.3 worm gear 1175.3
1175.4 pinion 1175.4
1175.5 adjustment motor 1175.5
1175.6 adjustment motor sensor 1175.6
1175.7 housing cover 1175.7
1175.8 preload spring 1175.8
1175.9 threaded barrel 1175.9
1176 Chain take-up idler arm assembly 1176
1177 Chain take-up cam arm assembly 1177
1178 Chain take-up idler assembly 1178
1180 Automatic static chain adjustment controller 1180
1181 Automatic static chain adjustment interface 1181
1185 Automatic static chain adjustment indicator 1185

Figure 4:
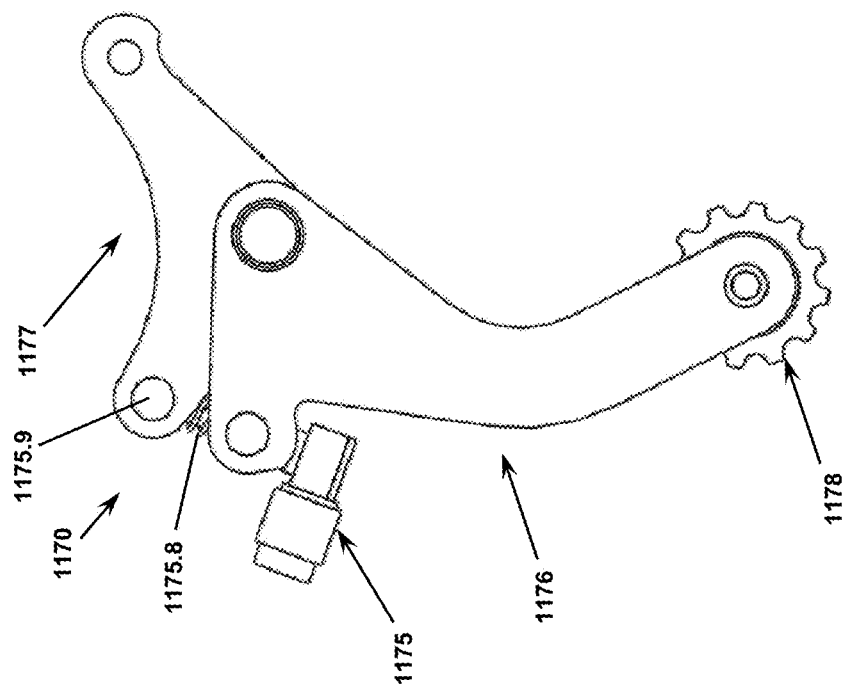
FIG. 4 is a side view of an embodiment of the improved final drive chain adjuster, showing chain adjustment with an alternative automatic static adjustment.

A third possible embodiment of the invention offers means for automatic adjustment of tension in the final loop drive element 744. FIG. 4 presents a third embodiment of the improved final drive chain adjuster which provides automatic static chain adjustment. In this embodiment, the chain take-up adjustment assembly 766 (as disclosed in the previous embodiments) is replaced with an automatic actuator comprising an automatic static chain adjustment assembly 1175 and a modified chain take-up idler arm assembly. The chain take-up idler arm assembly 1176 is configured to allow space for the automatic static chain adjustment assembly 1175.

Figure 5:
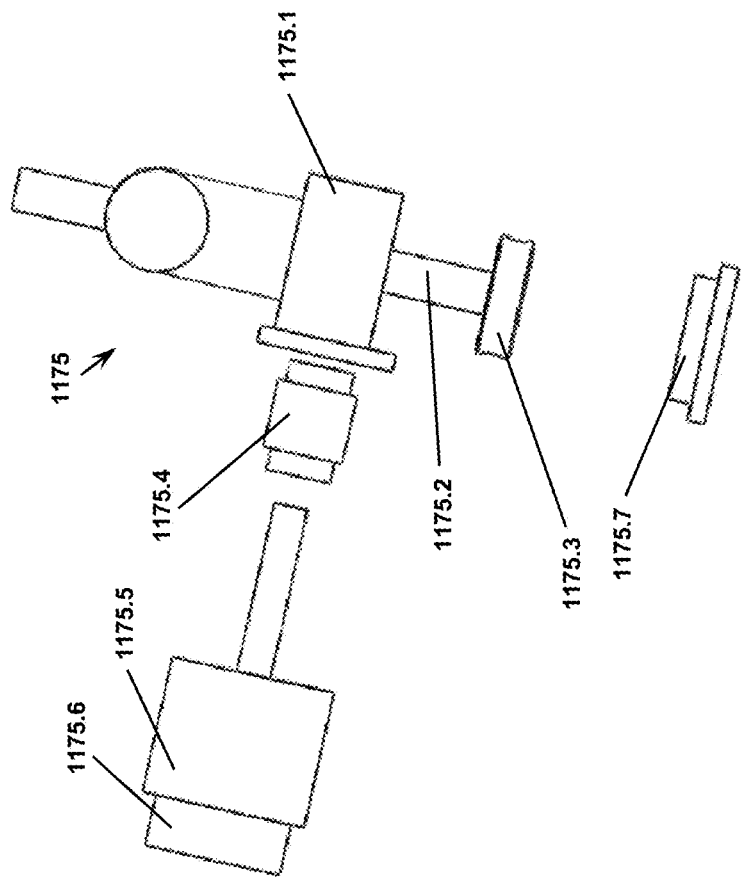
FIG. 5 is an exploded view of the automatic static adjustment actuator seen in FIG. 4.

Attention is invited to FIG. 5, depicting an exploded view of the automatic static chain adjustment assembly 1175 according to this embodiment. The automatic static chain adjustment assembly 1175 includes a housing 1175.1; as seen in FIG. 4, the housing 1175.1 mounts into the chain take-up idler arm assembly 1176 in a manner similar to the connection of the chain take-up adjustment barrel with lock 766.3, as described for previous embodiments. As seen in FIG. 5, the housing 1175.1 also mounts an adjustment screw 1175.2 with worm gear 1175.3 affixed, an adjustment motor 1175.5, an adjustment motor sensor 1175.6, and pinion 1175.4. The automatic static chain adjustment assembly 1175 unit is sealed closed for environmental protection with a housing cover 1175.7. An electronic automatic static chain adjustment controller 1180 is required, whose operational decision tree flowchart is shown in FIG. 6. Also required in this embodiment is an automatic static chain adjustment interface 1181, and an automatic static chain adjustment indicator 1185, also depicted schematically in FIG. 6. If the vehicle has an onboard vehicle health monitoring system (known in the art), the automatic static chain adjustment controller 1180 could be and preferably is interfaced to it.

The logic for the automatic static chain adjustment controller 1180 is set forth in the block diagram of FIG. 6. The controller is a processing unit, preferably with firmware installed. First, either the vehicle operator (through an automatic static chain adjustment interface 1181) or the vehicle health monitor sends a command to the automatic static chain adjustment controller 1180 to perform a chain adjustment. Second, the controller 1180 decides if the tension in the chain (final loop drive element 744) requires adjustment, typically based on the length of time elapsed since the last chain adjustment. Advanced but known signal processing techniques, such as listening and filtering the chain noise could also be used, or an optic or other sensor could be deployed to determine chain vibration or slop. If the final loop drive element 744 doesn't require adjustment, then the controller stops and waits for another chain adjust command. If after signal input the controller 1180 determines the drive chain requires adjustment, then the controller next determines if power is being transmitted by the chain (i.e., final loop drive element 744). A sensor for determining this could be a transmission shift neutral indicator, because the chain cannot transmit power when the transmission is in neutral. If it determines that the chain is transmitting power, the controller 1180 does not actuate a next step, rather it waits until it is signaled that the chain is not transmitting power. When the chain is not transmitting power, then the controller 1180 proceeds to the next step, which is to signal the actuation of the adjustment motor 1175.5 to a predetermined current level. For an electric motor, the current and motor torque are related using knowledge in the art, so driving the electric motor 1175.5 to a predetermined current level results in the application of corresponding and resulting predetermined torque on the adjustment screw 1175.2 seen in FIG. 5.

Referring back to the graph of FIG. 2G, this applied adjustment screw torque moves along line A2 to the point 2 in the graph. If the motor 1175.5 cannot obtain the desired current level, then an error is detected and signaled. After the adjustment motor 1175.5 reaches the desired current level, the driving direction of the adjustment motor 1175.5 is then reversed for a determined screw displacement, as sensed by the adjustment motor sensor 1175.6. This reversed operation adjusts the screw along line B to position 3 in FIG. 2G. Because the motor 1175.5 drives the adjustment screw via the worm gear set pinion 1175.4 and worm gear 1175.3 of FIG. 5, the adjustment screw 1175.2 is effectively self-locking. When the foregoing sequence has been performed, the drive chain tension is adjusted, and the condition is indicated to a user by the automatic static chain adjustment indicator 1185. More advanced control algorithms could be created which would allow automatic chain adjustment when the chain is transmitting power, but all algorithms required are generally within the ordinary skill of the programming arts.

Detailed Description of a Fourth Embodiment

Here follows a listing of the components and their drawing figure label numerals for a fourth embodiment of the improved final drive chain adjuster:
1760 Chain Length take-Up 1760
1762 Chain take-up idler arm assembly 1762
1763 Chain take-up idler 1763
1764 Chain take-up cam arm assembly 1764
1764.1 Chain take-up cam arm 1764.1
1764.2 Chain take-up cam follower 1764.2
1764.3 Chain take-up cam follower fastener 1764.3
1764.4 Chain take-up cam follower nut 1764.4
1764.5 Chain take-up cam follower spring 1764.5
1766 Chain take-up adjustment assembly 1766
1766.1 Chain take-up adjustment screw 1766.1
1766.2 Chain take-up adjustment screw lock 1766.2
1766.3 Chain take-up adjustment barrel with lock 1766.3
1766.4 Chain take-up adjustment threaded barrel 1766.4
1766.5 Chain take-up adjustment preload spring 1766.5
1766.6 Chain take-up adjustment overload spring 1766.6
1768 Chain take-up cam 1768
1772 Chain take-up pivot 1772
1775 Chain take-up pivot support 1775

Figure 7A:
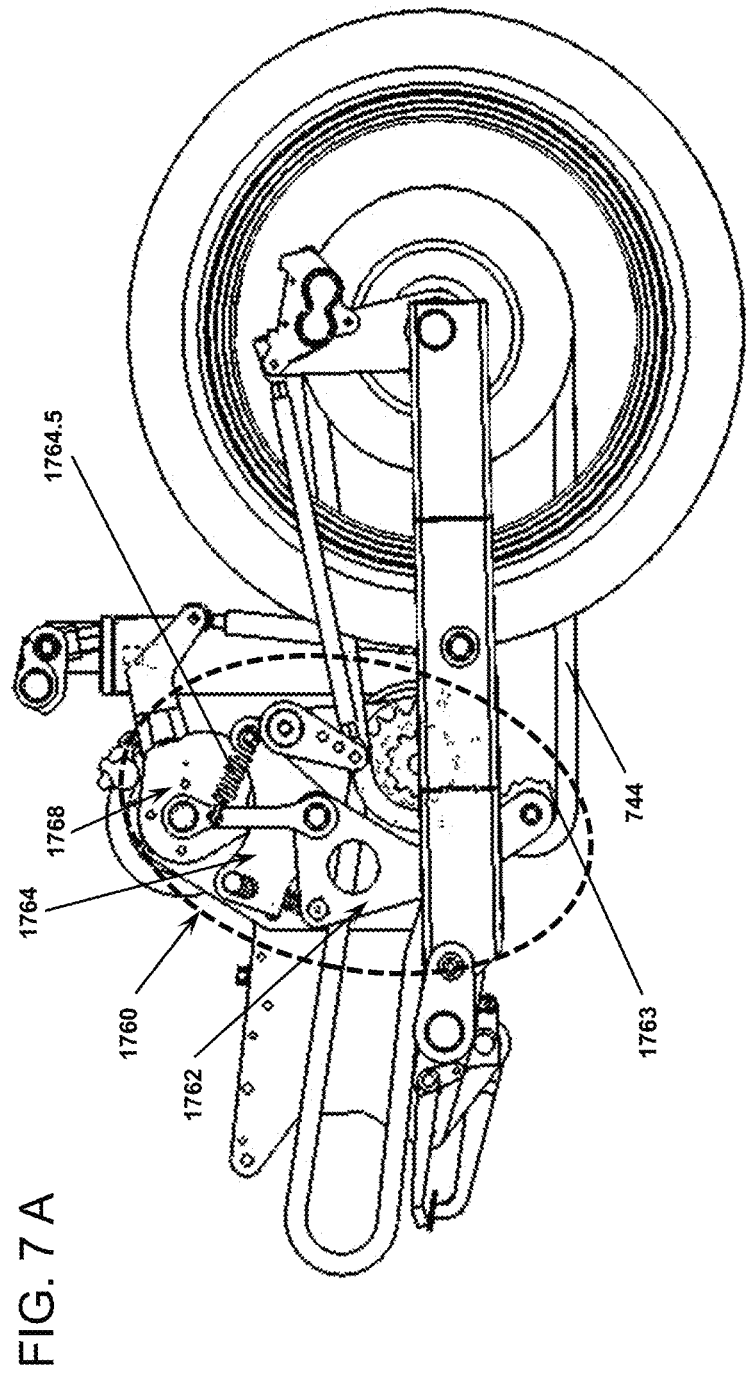
FIG. 7A is a side view showing an alternative embodiment chain adjustment system with an overload protection system.
Figure 7B:
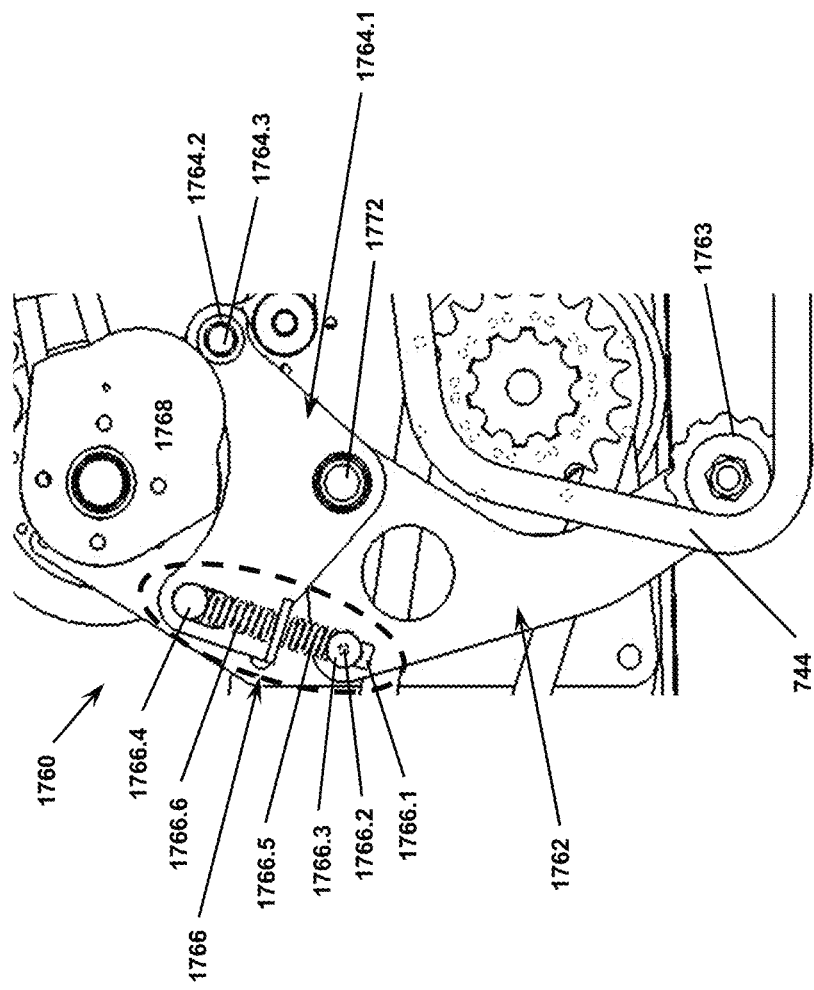
FIG. 7B is an enlarged side view of the embodiment of FIG. 7A, showing detail of a sectioned alternative embodiment chain adjustment system with an overload protection system.

A fourth embodiment of the invention features chain drive tension adjustment with overload protection. FIG. 7A presents a fourth embodiment of the improved final drive chain adjuster according to the present disclosure, and which provides an overload prevention capability for the chain (i.e. loop drive element 744). This capability allows the improved final drive chain adjuster to limit the maximum chain tension on the lower side of the chain drive if the chain drive is over tightened, or debris is caught between the chain and a pinion. In this fourth embodiment, the chain take-up cam arm assembly 764 as described for the first embodiment is replaced with an assembly that allows for overload protection, the chain take-up cam arm assembly 1764 seen in FIGS. 7A and 7B. The protection is accomplished by mounting the chain take-up adjustment threaded barrel 1766.4 (substantially similar to take-up adjustment threaded barrel 766.4 of the first embodiment) in an elongated slot defined in or through the chain take-up cam arm assembly 1764, instead of a round hole, and providing a stiff chain take-up adjustment overload spring 1766.6 as best seen in FIG. 7B. The action of adjustment overload spring 1766.6 (in compression) urges and pushes the chain take-up adjustment threaded barrel 1766.4 upward against the upper end of the slot, in a direction away from the chain take-up idler arm assembly 1762. The chain take-up adjustment overload spring 1766.6 preferably is disposed between, and pushes longitudinally between, the chain take-up adjustment threaded barrel 1766.4 and a rigid tab fixed to and extending out from a face of the chain take-up cam arm assembly 1764 (e.g., outward from cam arm 764.1). The chain take-up adjustment overload spring 1766.6 is compressed and has adequate stiffness such that the force required to move chain take-up idler assembly 1763 rearwards, against the force of the overload spring, is slightly higher than the maximum force the final loop drive element 744 could apply to the chain take-up idler 1763 under worst-case standard loads. Thus under ordinary operating conditions, the chain take-up adjustment threaded barrel 1766.4 is urged to, and held at, the upper terminus of the slot in the cam arm 1764.1. Providing for these relative forces, by selecting the proper spring constant for the overload spring 1766.6, assures that the overload spring doesn't generate a slack chain condition under standard operating conditions. When the final loop drive element 744 is being overloaded, the chain take-up adjustment overload spring 1766.6 compresses under the imposed force to allow the chain take-up adjustment threaded barrel 1766.4 to shift a distance down in the slot defined in the chain take-up cam arm assembly 1764—thereby compressing the chain take-up adjustment overload spring 1766.6, temporarily relieving and thereby limiting the tension load on the final loop drive element 744.

Also shown in FIGS. 7A and 7B is optional, but preferable, chain take-up cam follower spring 1764.5, which is disposed between and connects to the chain take-up cam follower fastener 1764.3 and the chain take-up pivot support 1775 (FIG. 2E). This chain take-up cam follower spring 1764.5 preloads the chain take-up cam follower 1764.2 to press against the chain take-up cam 1768 advantageously to reduce rattling. The chain take-up cam follower spring 1764.5 in this embodiment also ensures that the chain take-up cam follower 1764.2 follows the chain take-up cam 1768 without relying solely on the tension force of the final loop drive element 744 to perform that function.

FIG. 8 provides a graph of the chain take-up adjustment screw 1766.1 torque verses the screw displacement as the screw threads into the chain take-up adjustment threaded barrel 1766.4 of this embodiment. The graph of FIG. 8 is very similar to the graph presented in FIG. 2 G for the first embodiment, except that at high screw torques and corresponding high screw loads, the chain take-up adjustment threaded barrel 1766.4 starts compressing the chain take-up adjustment overload spring 1766.6, and thus limits the peak load. In this current disclosure, this type of overload protection system will be called Overload 1.

As with the first and second embodiments, the fourth embodiment could also be adapted to use an Automatic static chain adjustment assembly with essentially the same control logic and controller. Except for the overload protection system discussed above, the fourth embodiment behaves in a similar fashion to the first embodiment.

Detailed Description of a Fifth Embodiment

Here follows a listing of the components and their drawing figure label numerals for a fifth embodiment of the improved final drive chain adjuster:

2760 Chain Length Take-Up 2760
2762 Chain take-up idler arm assembly 2762
2763 Chain take-up idler assembly 2763
2764 Chain take-up cam arm assembly 2764
2764.1 Chain take-up cam follower 2764.1
2764.2 Chain take-up cam follower fastener 2764.1
2764.3 Chain take-up cam follower spring 2764.1
2766 Chain take-up adjustment assembly 2766
2766.1 Chain take-up adjustment screw 2766.1
2766.2 Chain take-up adjustment screw lock 2766.2
2766.3 Chain take-up adjustment barrel 2766.3
2766.4 Chain take-up adjustment threaded barrel with lock 2766.4
2766.7 Chain take-up adjustment pre/overload spring 2766.7
2768 Chain take-up cam 2768
2772 Chain take-up pivot 2772
2775 Chain take-up pivot support 2775

Figure 9A:
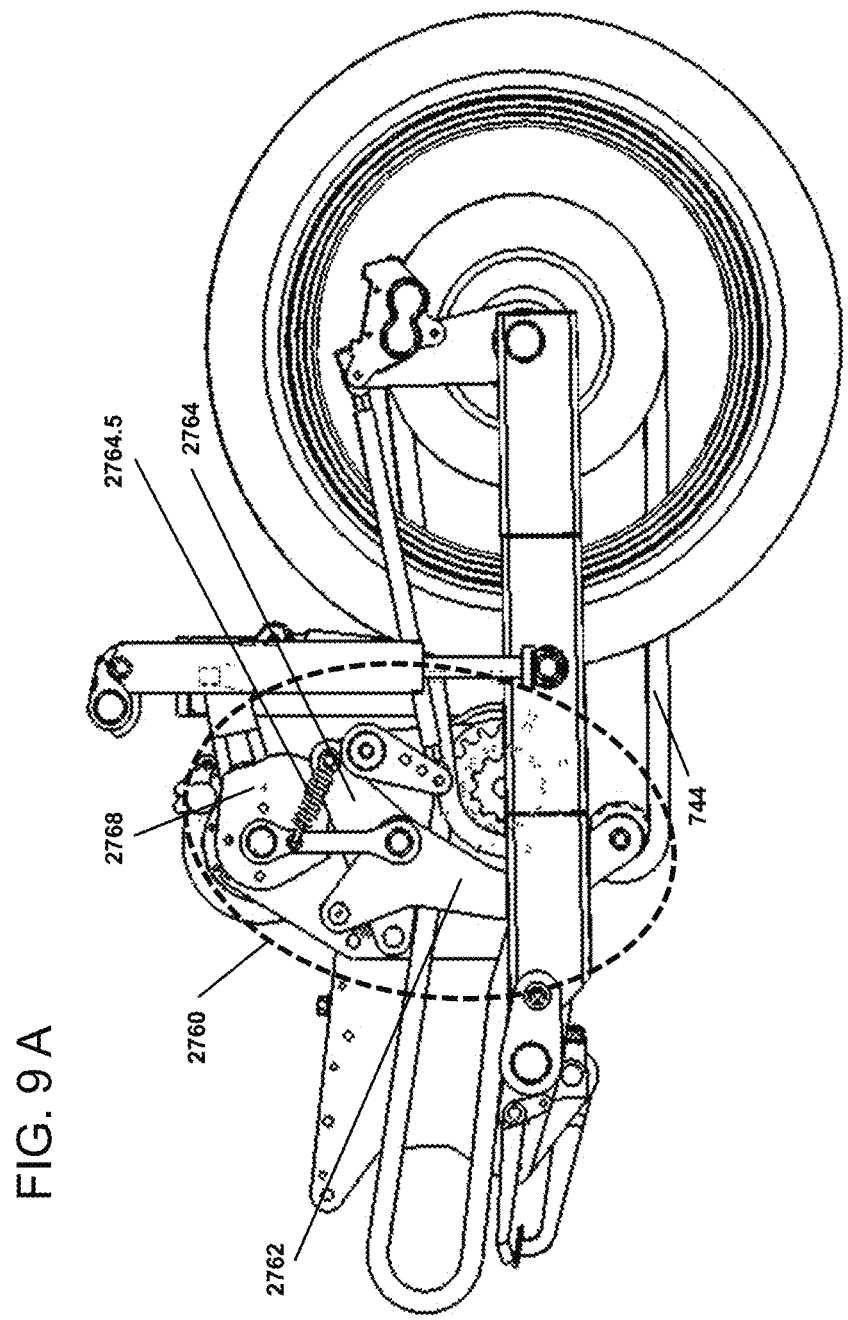
FIG. 9A is a side view showing an alternative embodiment of the improved final drive chain adjuster installed upon a vehicle.
Figure 9:
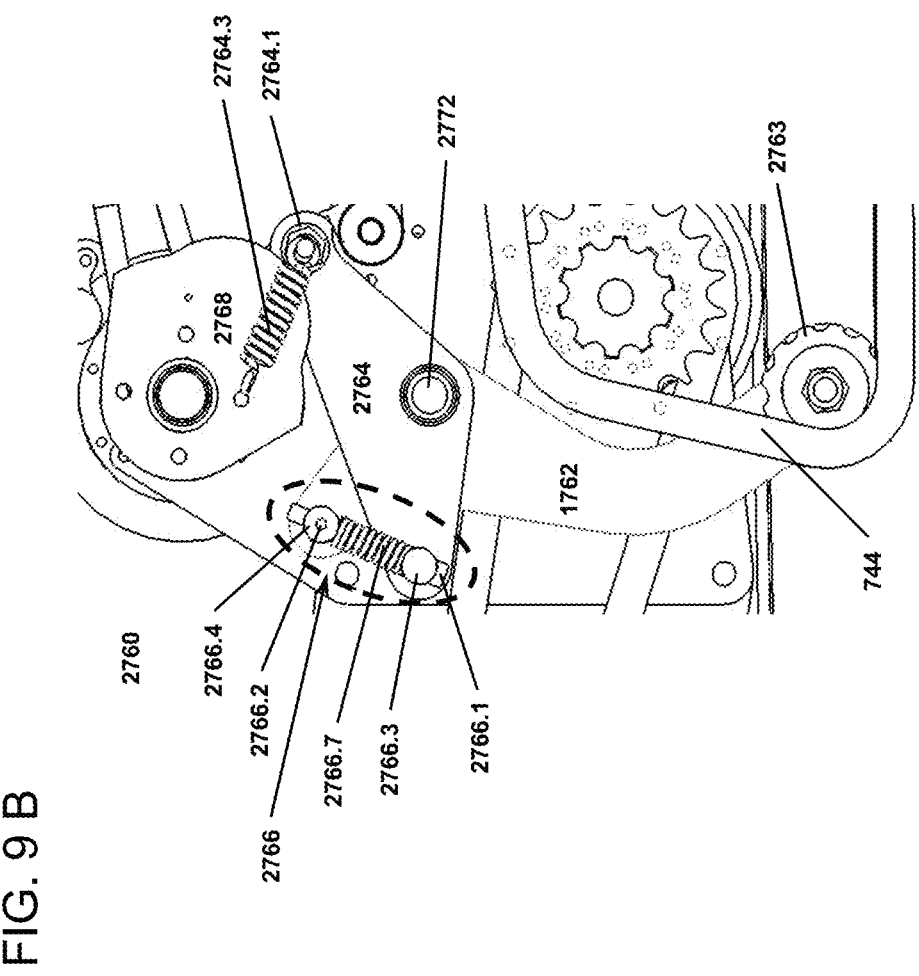
FIG. 9B is an enlarged side view of the embodiment of FIG. 9A, showing detail of a sectioned alternative embodiment chain adjustment system according to the present disclosure.
FIG. 9C is a graph showing static adjustment screw torque as a function of screw displacement for an embodiment of the present invention.

FIGS. 9A and 9 B present a fifth embodiment of the invention combining the chain take-up adjustment preload spring 1766.5 (analogous to adjustment preload spring 766.5 in the first embodiment) and the chain take-up adjustment overload spring 1766.6 into a single spring, a chain take-up adjustment pre/overload spring 2766.7. The method used to allow a single spring to perform these two functions is the reversing of the action of adjustment between the chain take-up idler arm assembly 2762 and chain take-up cam arm assembly 2764. The configuration of the cam arm assembly 2764 is modified slightly, and the idler arm assembly 2762 is reconfigured, as seen in FIG. 9A and especially 9B, and their relative angular positions on the take-up pivot 2772 are shifted slightly. As a result, and as best observed with reference to FIG. 9B, instead of the rotation of chain take-up adjustment screw 2766.1 (to shorten the distance between the adjustment barrel with lock 2766.3 and the adjustment barrel with lock 2766.4) causing a pivoting in the idle arm assembly 1762 to move chain take-up idler assembly 2763 forward to tighten the final loop drive element 744, the action of the chain take-up adjustment screw 2766.1 to shorten the distance between the adjustment barrel with lock 2766.3 and the adjustment barrel with lock 2766.4 induces a rearward movement the chain take-up idler assembly 2763. Such rearward movement decreases the effective chain path length, thereby loosing the final loop drive element 744 by decreasing tension therein. The single chain take-up adjustment pre/overload spring 2766.7 tends to urge apart the adjustment barrel with lock 2766.3 and the adjustment barrel with lock 2766.4, which accordingly biases the chain take-up idler assembly 2763 forward, thus tightening the final loop drive element 744. The chain take-up adjustment screw 2766.1 reduces the load in the spring 2766.7.

The chain take-up adjustment screw lock 2766.2 is on the chain take-up adjustment threaded barrel with lock 2766.4, so the locking screw should be made of a soft material so as not to damage the threads on chain take-up adjustment screw 2766.1. (Alternatively, some other provision should be made, such as a threaded puck between the chain take-up adjustment screw lock 2766.2 and the chain take-up adjustment screw 2766.1.) The chain take-up adjustment pre/overload spring 2766.7 of this embodiment is a stiff spring with adequate spring travel to supply a spring load which is higher than the maximum tension load applied to chain take-up idler assembly 2763 over the adjustment range of the chain length take-up 2760. In this application, this type of overload system will be termed overload 2.

Figure 9C:
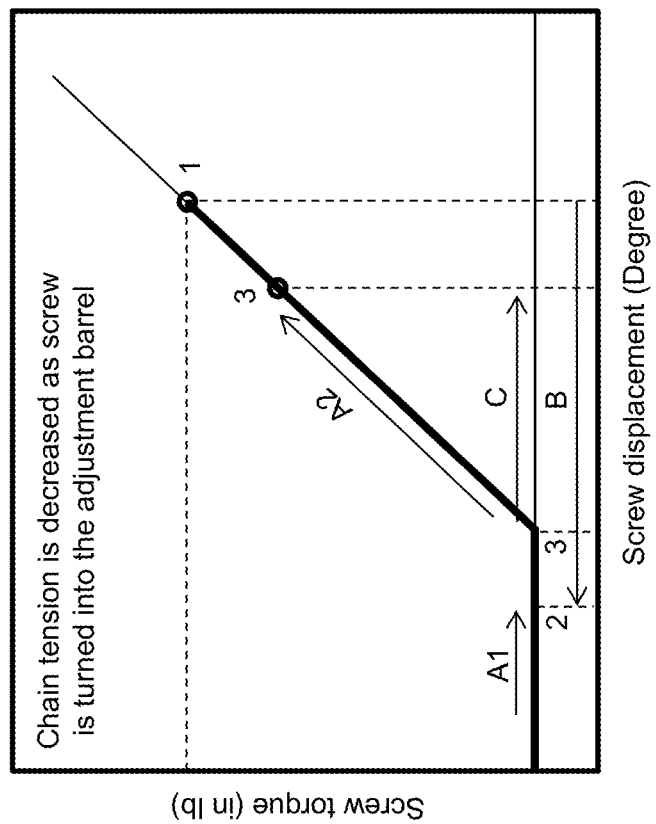

FIG. 10 presents a modification in the method for statically adjusting the final loop drive element 744, and in the relationship between chain take-up adjustment screw 2766.1 displacement and torque, under the action of the chain take-up adjustment pre/overload spring 2766.7 in this fifth embodiment. At the far left of the graph, the chain take-up adjustment screw 2766.1 is threaded out of chain take-up adjustment threaded barrel w lock 2766.4. With this embodiment, the final loop drive element 744 is not loose as with previously discussed embodiments, but fully tension to the overload value as supplied by chain take-up adjustment pre/overload spring 2766.7. As the chain take-up adjustment screw 2766.1 is threaded into chain take-up adjustment threaded barrel with lock 2766.4 along path A1, the torque begins to increase as the chain take-up adjustment screw 2766.1 contacts the chain take-up adjustment barrel 2766.3 and starts to compress the chain take-up adjustment pre/overload spring 2766.7 following path A2. In statically adjusting this embodiment, the chain take-up adjustment screw 2766.1 is turned a given displacement, shown by C in the graph of FIG. 9C, once the chain take-up adjustment screw 2766.1 contacts the chain take-up adjustment barrel 2766.3 and the torque increases. During service as the final loop drive element 744 wears, the spring load on chain take-up adjustment barrel 2766.3 increases to point 1 on the graph. To re-adjust the final loop drive element 744, the chain take-up adjustment screw 2766.1 is threaded out to point 2, then threaded back in to point 3, and then turned to point C.

When final loop drive element 744 is overloaded, the chain take-up adjustment pre/overload spring 2766.7 compresses and allows chain take-up idler assembly 2763 to move rearward and reduce limit tension. When this occurs, the chain take-up adjustment screw 2766.1 slides out of chain take-up adjustment barrel 2766.3, then returns once the overload event has ended.

Detailed Description of a Sixth Embodiment

Here follows a listing of the components and their drawing figure label numerals for a sixth embodiment of the improved final drive chain adjuster:
2180 Automatic static chain adjustment controller 2180
2181 Automatic static chain adjustment interface 2181
2185 Automatic static chain adjustment indicator 2185

In this sixth embodiment, the fifth embodiment and third embodiments described above are combined to create an improved final drive chain adjuster with an overload 2 type system and an automatic static chain adjust. FIG. 10 presents a block diagram illustrating a decision tree for an automatic static chain adjustment controller 2180. This is similar to the block diagram presented in FIG. 6, except for the third decision block which in the third embedment was "Drive static adjuster motor to desired current," in this sixth embodiment is changed to "Drive motor backwards then forwards to find contact point." In this block of automatic static chain adjustment controller 2180, an algorithm is executed for determining the break point where the chain take-up adjustment screw 2766.1 just minimally contacts the chain take-up adjustment barrel 2766.3, and the screw torque or motor current increase from the minimum. A possible algorithm is to run the adjustment motor 1175.5 backwards while monitoring the current, and then stopping the adjustment motor 1175.5 as the current obtains the minimum current and stops decreasing. The adjustment motor 1175.5 is then slowly run forward until the current starts increasing. Once this step has been completed, the logic follows the block diagram similar to the third embodiment.

Detail Description of a Seventh Embodiment

Here follows a listing of the components and their drawing figure label numerals for a seventh embodiment of the improved final drive chain adjuster:
3760 Chain length take-up 3760
3763 Chain take-up arm assembly 3763
3763.1 Chain take-up idler 3763.1
3764.2 Chain take-up cam follower fastener 3764.2
3763.3 Chain take-up cam follower spring 3763.3
3763.4 Chain take-up cam follower 3763.4
3765 Chain take-up idler assembly 3765
3766 Prior art Chain take-up adjustment 3766
3768 Chain take-up cam 3768
3772 Chain take-up pivot 3772
3775 Chain take-up pivot support 3775

Figure 11:
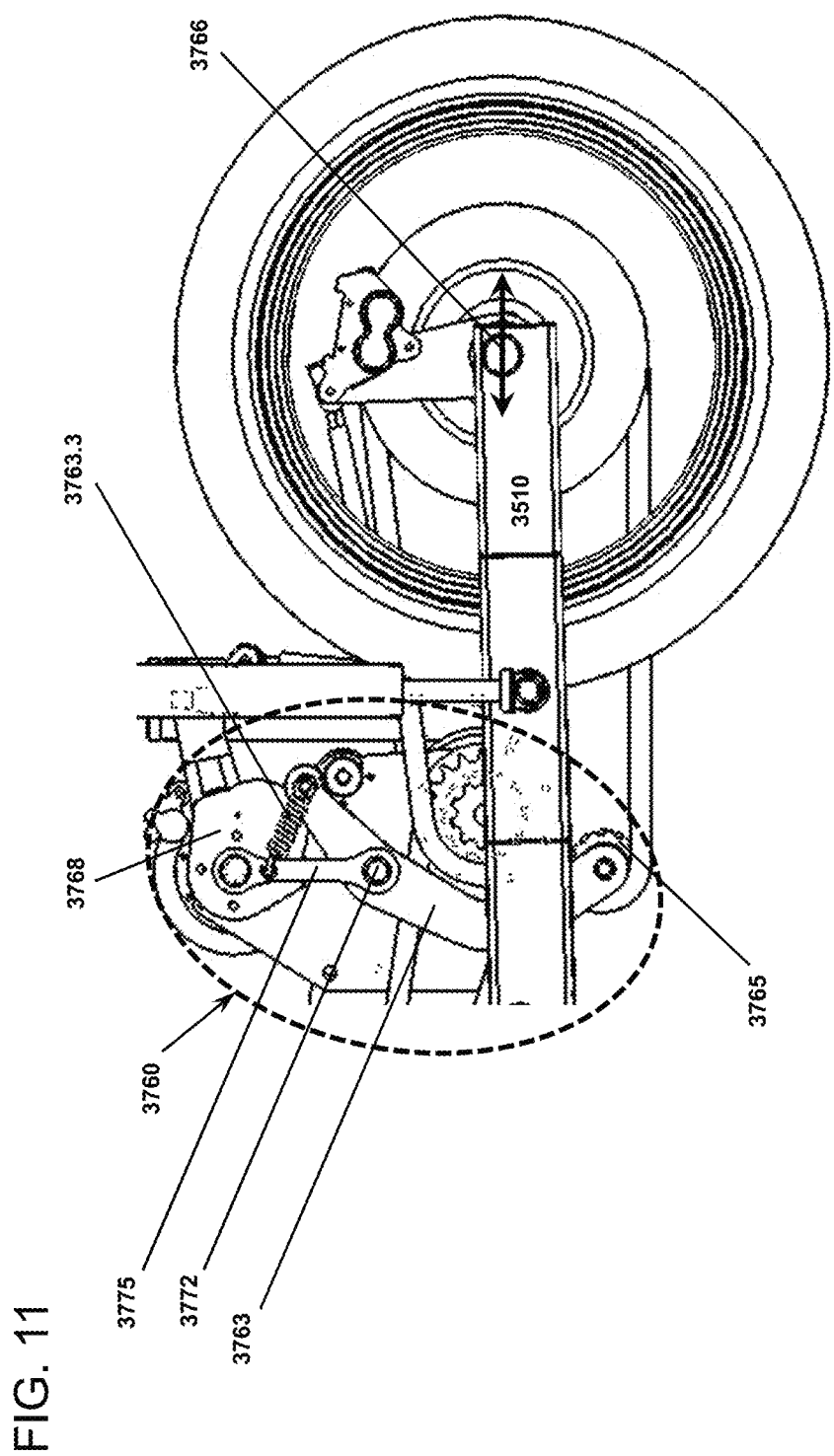
FIG. 11 is a side view showing another alternative embodiment chain adjustment system without static adjustment, as installed upon a vehicle.

In this seventh embodiment, illustrated generally in FIG. 11, the improved final drive chain adjuster is shown in its simplest form without any means for static adjustment or any overload protection. In lieu of the chain take-up idler arm assembly 762 and the chain take-up cam arm assembly 764 of previous embodiments, there is provided a chain take-up arm assembly 3763 lacking any static adjust capability. An alternative means or mode of static chain adjustment method accordingly is required, including more conventional modes such as moving the rear axle and wheel. Still, a static chain could be adjusted independently, because this embodiment compensates for chain path effective length variation over the range of suspension travel. This embodiment would be the simplest system to manufacture.

Detailed Description of an Eighth Embodiment

Here follows a listing of the components and their drawing figure label numerals for an eighth embodiment of the improved final drive chain adjuster:
4510 trailing arm 4510
4760 Chain Length Take-Up 4760
4762 Chain take-up idler arm assembly 4762
4763 Chain take-up idler assembly 4763
4764 Chain take-up cam arm assembly 4764
4764.1 Chain take-up cam follower 4764.1
4764.2 Chain take-up cam follower fastener 4764.2
4764.3 Chain take-up cam follower spring 4764.3
4766 Chain take-up adjustment assembly 4766
4766.1 Chain take-up adjustment screw 4766.1
4766.2 Chain take-up adjustment screw lock 4766.2
4766.3 Chain take-up adjustment barrel 4766.3
4766.4 Chain take-up adjustment threaded barrel with lock 4766.4
4766.7 Chain take-up adjustment pre/overload spring 4766.7
4768 Chain take-up cam (fixed to trailing arm) 4768
4772 Chain take-up pivot 4772

Figure 12:
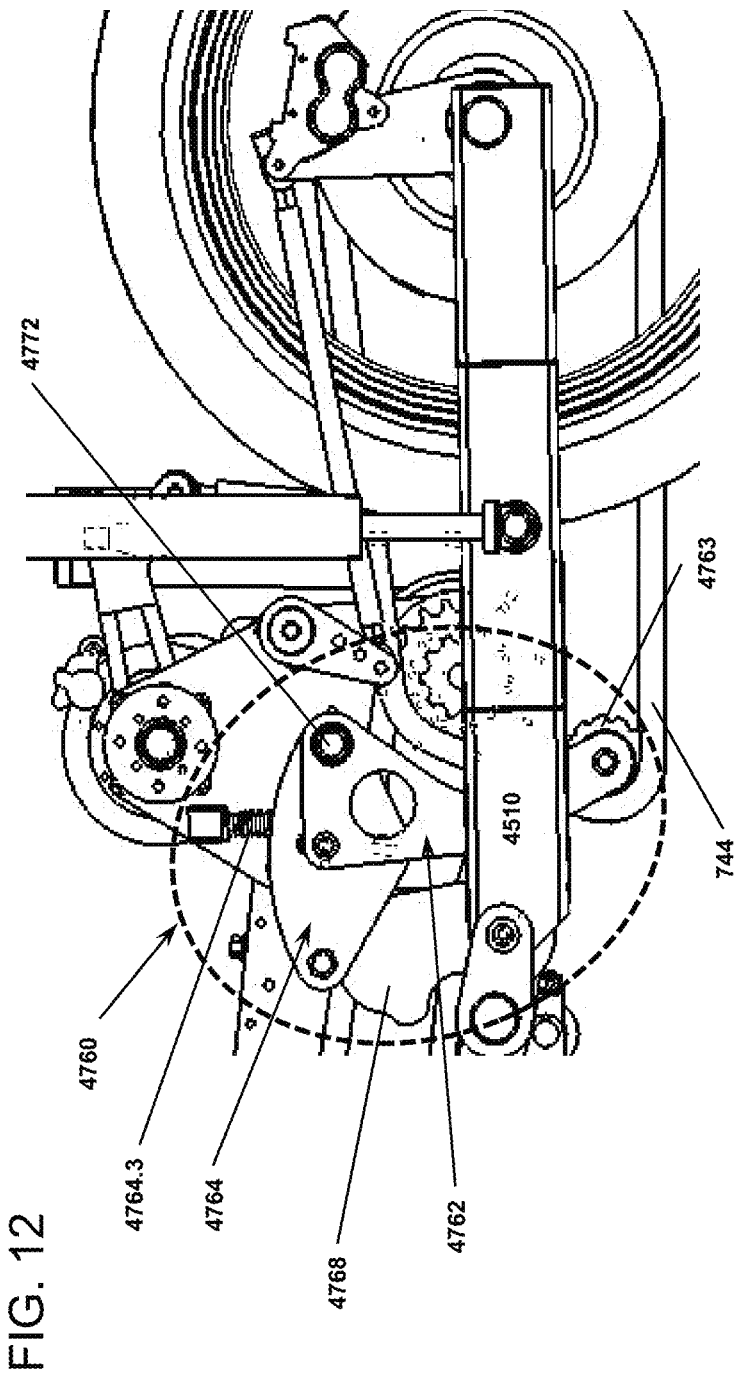
FIG. 12 is a side view showing another alternative embodiment chain adjustment system with an overload protection system and a chain take-up adjust cam mounted to the trailing arm of a vehicle.
Figure 13:
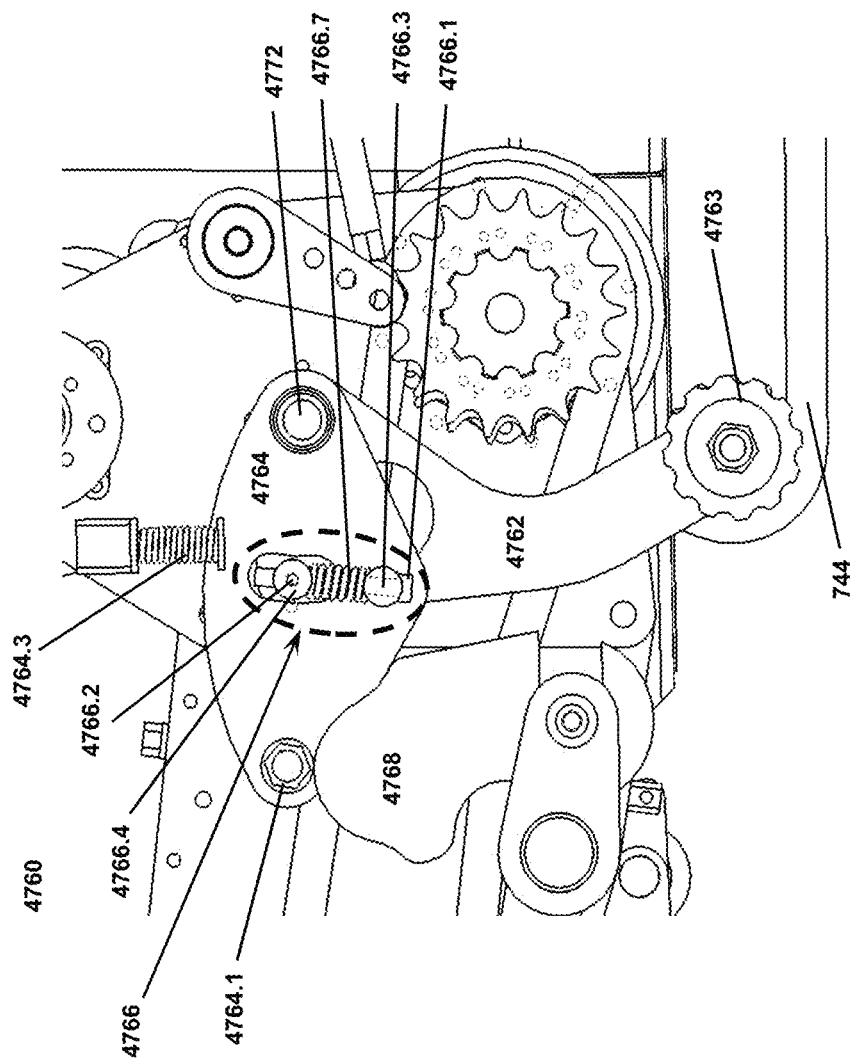
FIG. 13 is an enlarged side view showing detail of a sectioned alternative embodiment chain adjustment system with an overload protection system and a chain take-up adjust cam mounted to the trailing arm of the vehicle, similar to the embodiment of FIG. 12.

FIGS. 12 and 13 illustrate an eighth embodiment of the improved final drive chain adjuster 4760. This embodiment is similar to the fifth embodiment with the overload 2 type of overload protection, except that in this embodiment a chain take-up cam 4768 is mounted directly to the vehicle trailing arm 4510, instead of upon an auxiliary shaft elsewhere on the vehicle, such as on the lockable ARB assembly 480 (e.g., bar 482) of previous embodiments. The overload and adjustment components, including the adjustment screw 4766.1, take-up adjustment screw lock 4766.2, adjustment barrel 4766.3, adjustment threaded barrel with lock 4766.4, and adjustment pre/overload spring 4766.7 operate in substantially the same roles as in the fifth embodiment. The take-up cam follower spring 4764.3 biases the cam arm assembly 4764 to maintain the cam follower 4764.1 in contact with the cam profile surface of the cam 4768. Other components, such as a chain take-up idler arm assembly 4762 and chain take-up cam arm assembly 4764, have been modified as shown in FIGS. 12 and 13 for this change in cam location.

The chain take-up cam 4768 (fixed to the trailing arm) requires a functional base radius large enough for proper cam action by the eccentric cam profile acting on the chain take-up cam follower 4764.1, because the angular travel of the trailing arm 4510 is comparatively less than that of the lockable ARB assembly 480 of, for example, the first embodiment. Besides the change in location of the cam 4768, this embodiment functions and operates in a substantially similar manner as the other embodiments previously described hereinabove. The automatic static chain adjuster as discussed in fifth embodiment could also be used with this embodiment.

Detailed Description of a Ninth Embodiment

Here follows a listing of the components and their drawing figure label numerals for a ninth embodiment of the improved final drive chain adjuster:
5510 trailing arm 5510
5760 Chain length take-up 5760
5762 Chain take-up idler arm assembly 5762
5763 Chain take-up idler assembly 5763
5764 Chain take-up cam arm assembly 5764
5764.1 Chain take-up cam follower 5764.1
5764.2 Chain take-up cam follower fastener 5764.2
5766 Chain take-up adjustment assembly 5766
5766.1 Chain take-up adjustment screw 5766.1
5766.2 Chain take-up adjustment screw lock 5766.2
5766.3 Chain take-up adjustment barrel with lock 5766.3
5766.4 Chain take-up adjustment threaded barrel 5766.4
5766.5 Chain take-up adjustment preload spring 5766.5
5766.6 Chain take-up adjustment overload spring 5766.6
5772 Chain take-up pivot 5772
5768 Chain take-up cam (fixed to trailing arm) 5768

Figure 14:
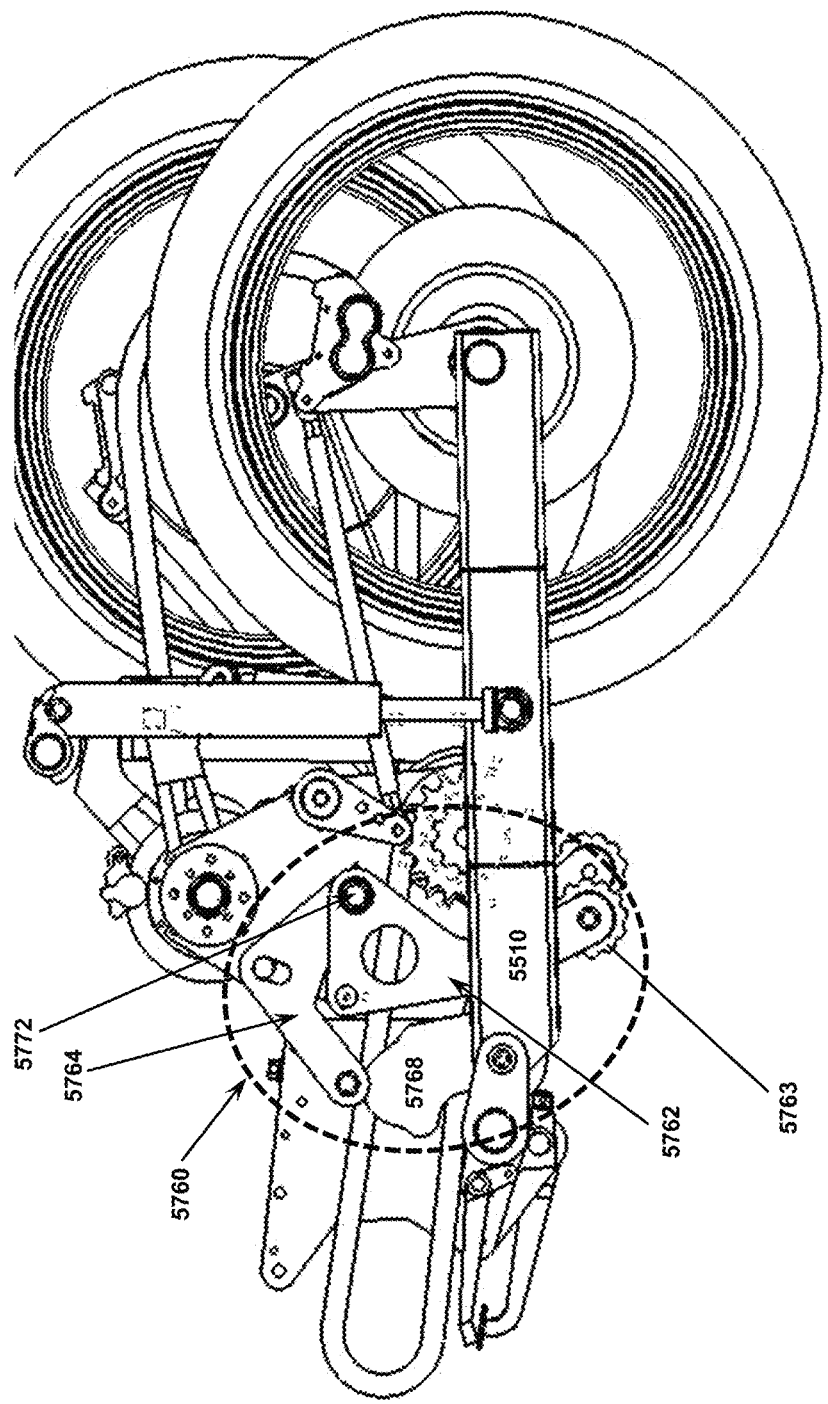
FIG. 14 is a side view showing another alternative embodiment chain adjustment system with an overload protection system according to the present disclosure.
Figure 15:
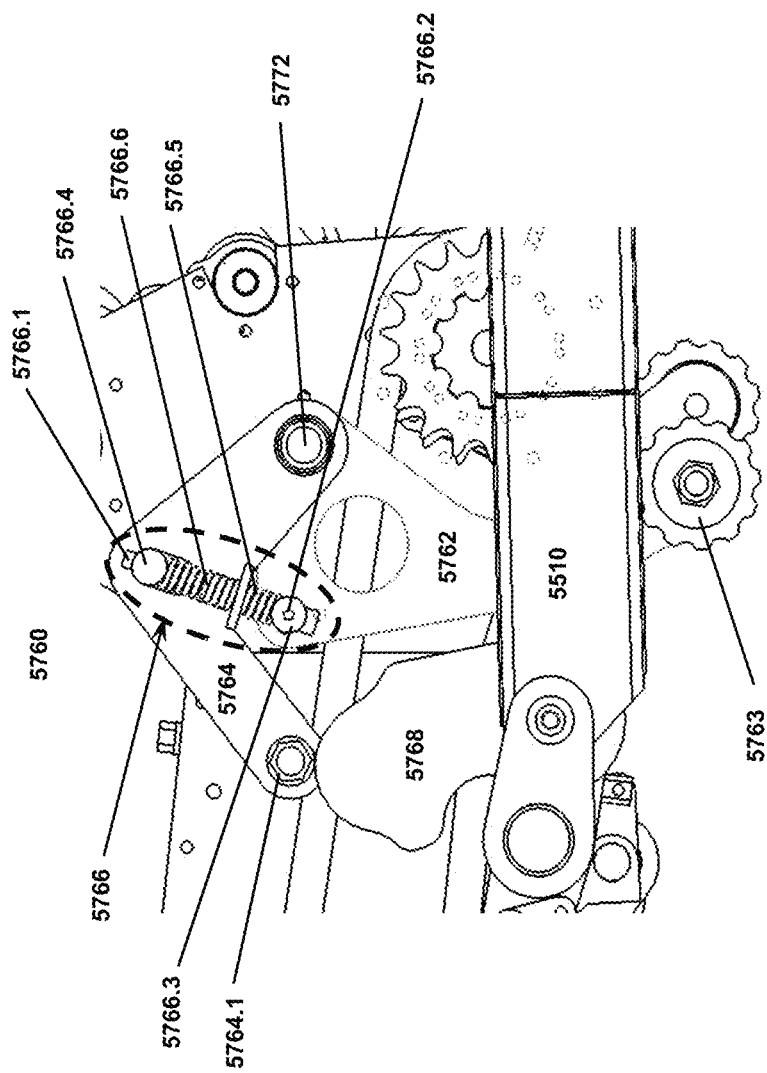
FIG. 15 is an enlarged side view showing detail of a sectioned alternative embodiment chain adjustment system with an overload protection system, similar to the embodiment of FIG. 14.

Combined reference is now made to FIGS. 14 and 15, depicting a ninth embodiment of the improved final drive chain adjuster 5760. This embodiment is similar to the fourth embodiment with the overload 1 type of overload protection, as described above, except that in this ninth embodiment a chain take-up cam 5768 is mounted directly upon the vehicle trailing arm 5510, instead of to an auxiliary shaft such as the lockable ARB assembly 480 of, for example, the first embodiment. The configurations of certain components, such as the chain take-up idler arm assembly 5762, and the chain take-up cam arm assembly 5764 have been modified as shown in FIGS. 14 and 15 to accommodate this change in cam location.

The chain take-up cam 5768 (mounted on the trailing arm) requires a functional base radius large enough for proper cam action, by the eccentric cam profile acting on the chain take-up cam follower 5764.1, because the angular travel of the trailing arm 5510 is comparatively less than that of the lockable ARB assembly 480.

Besides the change in location of the cam, this embodiment functions and operates in a manner substantially similar to the other embodiments described previously. The automatic static chain adjuster as disclosed in conjunction with the third embodiment could also be used with this embodiment.

Detailed Description of a Tenth Embodiment

Here follows a listing of the components and their drawing figure label numerals for a tenth embodiment of the improved final drive chain adjuster:
6510 Trailing arm 6510
6492 ARB arm assembly—fixed 6492
6493 ARB arm assembly—floating 6493
6760 Chain length take-up 6760
6762 Chain take-up arm assembly 6762
6762.2 Chain take-up cam follower 6762.2
6762.3 Chain take-up cam follower fastener 6762.3
6763 Chain take-up idler assembly 6763
6766 static chain take-up adjustment 6766
6768 Chain take-up cam 6768
6772 Chain take-up pivot (on trailing arm) 6772

Figure 16:
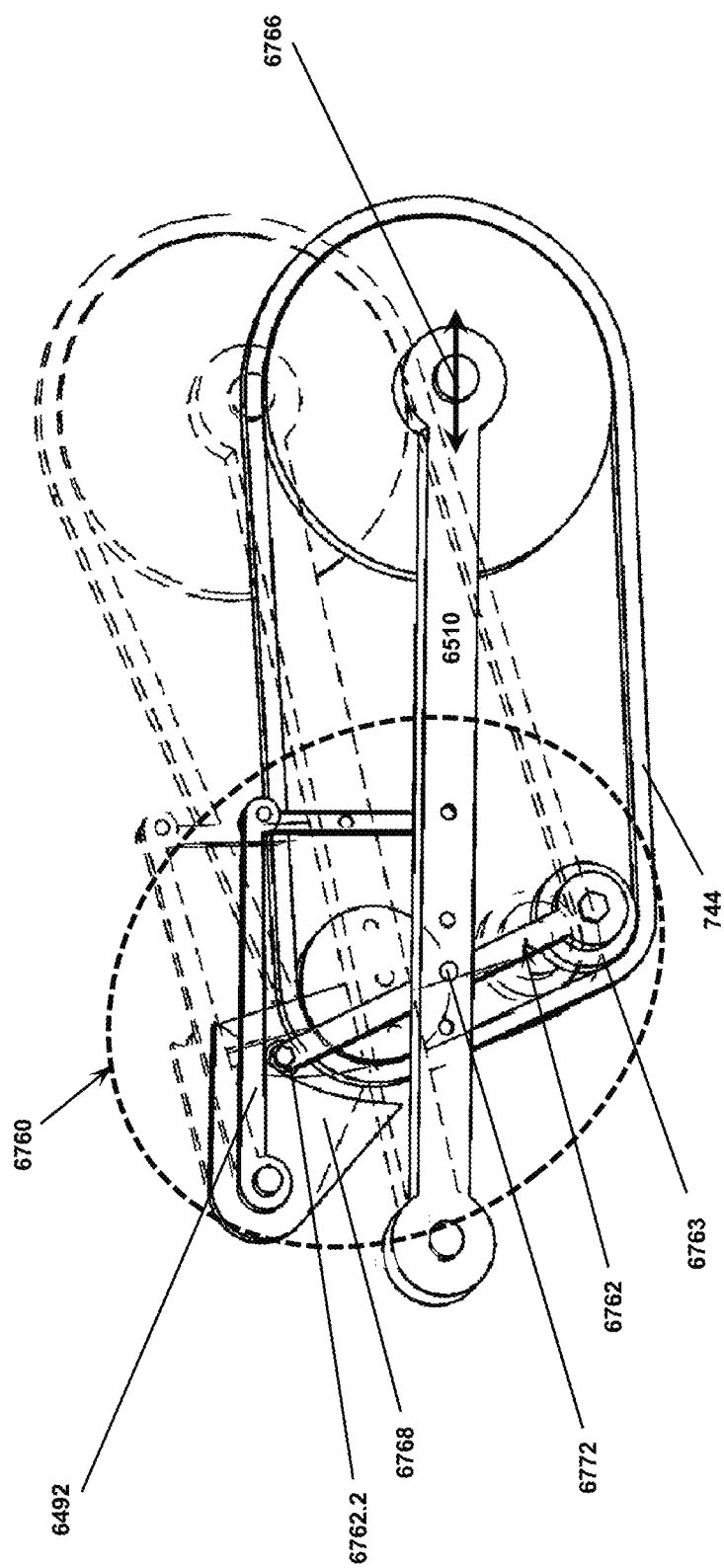
FIG. 16 is a side view showing still another alternative embodiment of the chain adjustment system.

FIG. 16 offers a schematic diagram of the tenth embodiment of the improved final drive chain adjuster 6760, which has similar functionality to the seventh embodiment discussed above. In this embodiment, the chain take-up pivot 6772 is located onto the trailing arm 6510, instead of being mounted on the vehicle chassis 110 as in the other embodiments, such as the first embodiment. The chain take-up cam 6768 is mounted to the lockable ARB assembly 480, as with the first embodiment. Similar methodology could be used to determine the cam profile and to optimize this system depending on the vehicle application.

This tenth embodiment operates in a manner similar to that of the seventh embodiment, and thus requires a means and method for statically adjusting chain tension. Having the chain take-up pivot 6772 on the trailing arm 6510 does not preclude the use of any of the other features and capabilities discussed with respect to the other embodiments, such as a static chain adjust, automatic static chain adjust, or overload protection, which may easily be added to this embodiment.

Detailed Description of an Eleventh Embodiment

Here follows a listing of the components and their drawing figure label numerals for an eleventh embodiment of the improved final drive chain adjuster:
7510 Trailing arm 7510
7760 Chain length take-up 7760
7762 Chain take-up arm assembly 7762
7762.2 Chain take-up cam follower 7762.2
7762.3 Chain take-up cam follower fastener 7762.3
7763 Chain take-up idler assembly 7763
7766 Prior art static chain take-up adjustment 7766
7768 Chain take-up cam (on chassis) 7768
7772 Chain take-up pivot (on trailing arm) 7772

Figure 17:
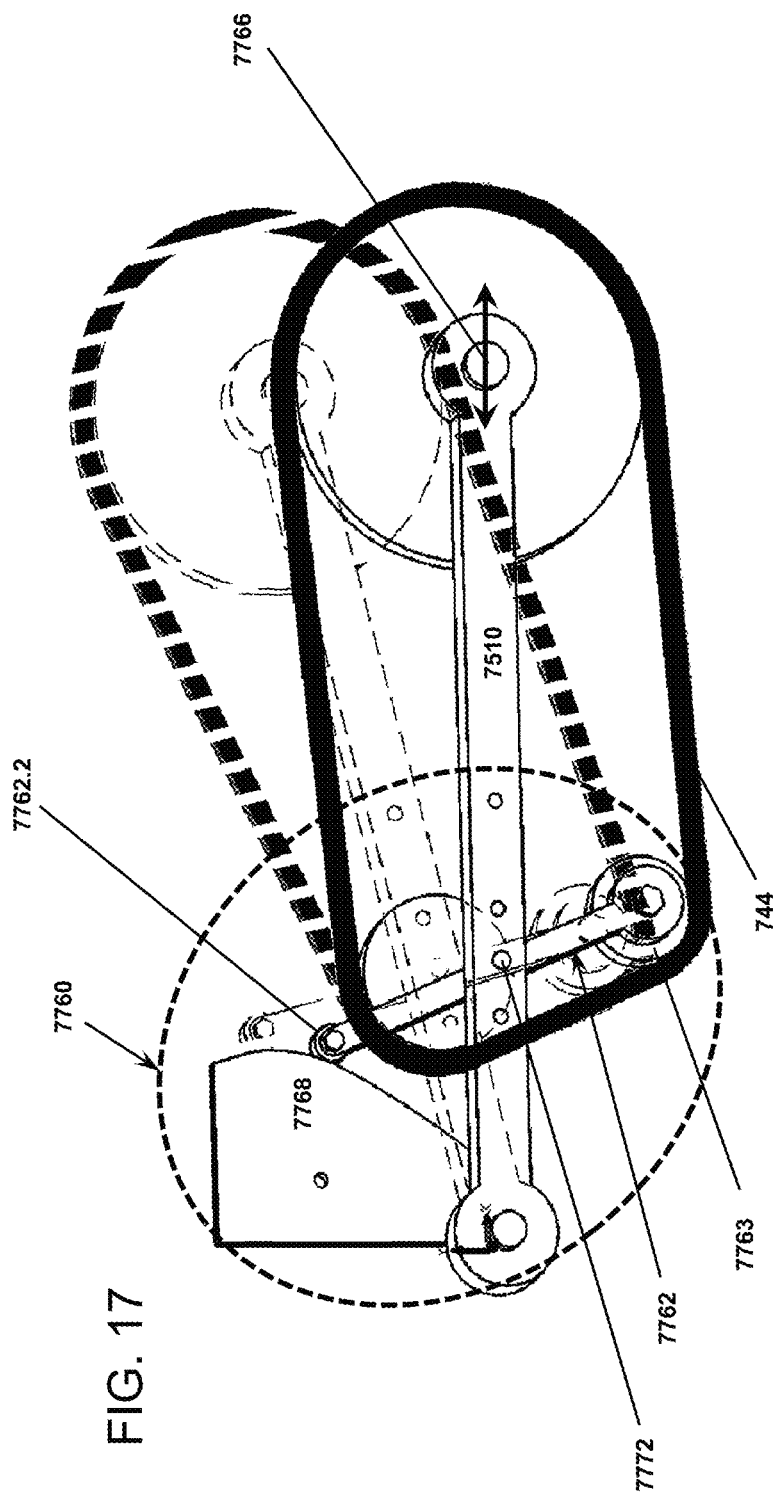
FIG. 17 is a side view showing yet another alternative embodiment of the chain adjustment system.

An eleventh possible embodiment of the improved final drive chain adjuster, which has similar functionality to the seventh embodiment discussed, is depicted in FIG. 17. In this embodiment, similar also to the embodiment of FIG. 16, the chain take-up pivot 7772 located and mounted onto the trailing arm 7510, instead of on the vehicle chassis 110. However, unlike any previous embodiment, the chain take-up cam 7768 is mounted on the vehicle chassis 110. Similar methodologies may be used to determine the cam profile, and to optimize this embodiment depending on the vehicle application, as mentioned previously hereinabove.

This eleventh embodiment operates in a similar fashion as the seventh embodiment and, like that embodiment, requires a means or mode for static chain tension adjustment. Notably, disposing the chain take-up pivot 7772 on the vehicle's trailing arm 7510 does not preclude the use of any of the other features and capabilities mentioned above and relating to the other embodiments, such as a static chain adjust, automatic static chain adjust, or overload protection, with which this embedment may be adapted.

Detailed Description of a Twelfth Embodiment

Here follows a listing of the components and their drawing figure label numerals for a twelfth embodiment of the improved final drive chain adjuster:
12760 final drive train adjuster 12762
12762 chain take-up arm assembly 12762
12763 chain take-up idler assembly 12763
12764 chain take-up master cylinder 12764
12764.1 chain take-up master cylinder housing 12764.1
12764.2 chain take-up master cylinder piston rod assembly 12764.2
12765 chain take-up slave cylinder 12765
12765.1 chain take-up slave cylinder housing 12765.1
12765.2 chain take-up slave cylinder piston rod assembly 12765.2
12766 chain take-up manual adjust 12766
12766.1 chain take-up manual adjust housing 12766.1
12766.2 chain take-up manual adjust piston rod assembly 12766.2
12768 chain take-up cam 12768
12769 chain take-up piping 12769
12771 hydraulic fluid 12771
12772 chain take-up pivot 12772

Figure 18:
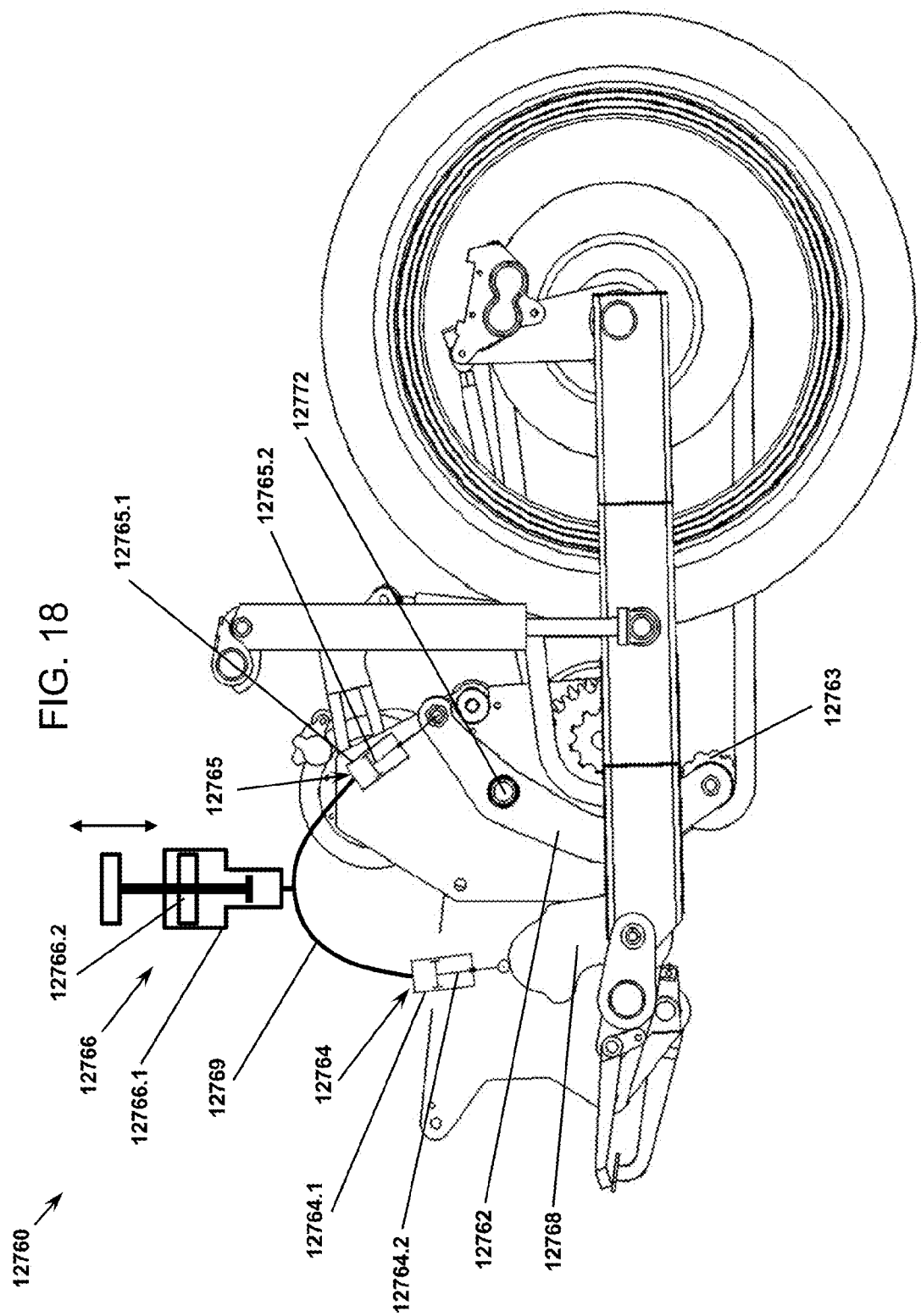
FIG. 18 is a side view showing still another alternative embodiment chain adjustment system, with hydraulic actuation.

Referring to FIG. 18, there is disclosed a twelfth possible embodiment of the improved final drive chain adjuster 12760. The final drive chain adjuster features hydraulic actuation means, between the chain take-up arm assembly 12762 and the chain take-up cam 12768 (which take-up cam is fixedly mounted onto the trailing arm 510), for converting motion of the take-up cam into corresponding motion in the take-up arm assembly.

In this embodiment, the hydraulic actuation means for converting motion of the take-up cam into corresponding motion in the take-up arm assembly comprises a chain take-up master cylinder 12764 including a chain take-up master cylinder housing 12764.1 (rigidly mounted to the vehicle chassis 110), and a chain take-up master cylinder piston rod 12764.2. The hydraulic actuation means also comprises a take-up slave cylinder housing 12765.1, with a cylinder piston rod assembly 12765.2 movably engaged therewith and operably connected to the take-up arm assembly 12762, and hydraulic piping 12769 for providing hydraulic communication between the master cylinder housing 12764.1 and the slave cylinder housing 12765.1. The master cylinder rod 12764.2 is allowed to slide into and out of, and be guided in its axial movement by, the chain take-up master cylinder housing 12764.1. The motion of the chain take-up cam 12768 (resulting from the motion of the trailing arm 510) and cam follower on the outer end of the chain take-up master cylinder piston rod 12764.2 pushes hydraulic fluid 12771 under pressure in the hydraulic piping 12769. The hydraulic fluid passes through the chain take-up piping 12769, past a connection to chain take-up manual adjust 12766, and into the chain take-up slave cylinder 12765. The hydraulic fluid 12771 in chain take-up slave cylinder housing 12765.1 consequently pushes on the chain take-up slave cylinder piston rod assembly 12765.2. Under the change in hydraulic pressure, chain take-up slave cylinder piston rod assembly 12765.2 moves the chain take-up arm assembly 12762 to the correct position for a constant chain drive path effective length. This movement is determined by the chain take-up cam 12768, the fluid areas of the chain take-up master cylinder 12764 and chain take-up slave cylinder 12765, and the lever ratio of chain take-up arm assembly 12762.

A chain take-up manual adjust 12766 cylinder provides an easy method for static chain drive adjustment. This chain take-up manual adjust 12766 includes a chain take-up manual adjust housing 12766.1, which has a hydraulic cylinder with a threaded cylinder situated above it, and a chain take-up master cylinder piston rod assembly 12764.2. The take-up master cylinder piston rod assembly 12764.2 includes a hydraulic piston, a threaded cylinder and a manual adjust handle. When the manual adjust handle of chain take-up master cylinder piston rod assembly 12764.2 is rotated, the threaded section pushes the piston section into, or out of, the cylinder portion of chain take-up manual adjust housing 12766.1. This in-and-out action of the piston section pushes hydraulic fluid 12771 into or out of the chain take-up slave cylinder 12765, thereby adjusting the positioning the chain take-up idler assembly 12763.

The chain take-up master cylinder housing 12764.1 preferably is mounted to the vehicle chassis, and guides the chain take-up master cylinder piston rod 12764.2. Moment loading from the motion of the chain take-up cam 12768 are resisted, as tangential loads applied by the cam to the master cylinder piston rod 12764.2 are accommodated by the rolling (on the cam 2768) of the cam follower rotatably mounted on the outer end of the chain take-up master cylinder piston rod 12764.2. The chain take-up slave cylinder housing 12765.1 preferably is pivotally mounted to the vehicle chassis, to allow for in-plane rotation as the pick-up point on the chain take-up arm assembly 12762 swings as the arm assembly moves. As with any hydraulic system, the chain take-up piping 12769, hydraulic fluid contained therein, and other components in the hydraulic system must limit the fluid compressibility and expansion, so that motion applied to the chain take-up master cylinder piston rod 12764.2 is transmitted faithfully by the changing hydraulic fluid pressure to the chain take-up manual adjustment piston rod assembly 12766.2.

The operation and method of use of the twelfth embodiment is somewhat similar to those of the first embodiment. The torque-to-displacement relationship of chain take-up manual adjust piston rod assembly 12766.2 is similar to the torque-to-displacement ratio of the chain take-up adjustment screw 766.1, except that the motion ratio of the screw on chain take-up manual adjust piston rod assembly 12766.2 would be different from that of chain take-up adjustment screw 766.1 due to the hydraulic area ratios.

Detailed Description of a Thirteenth Embodiment

Here follows a listing of the components and their drawing figure label numerals for a thirteenth embodiment of the improved final drive chain adjuster:
13760 final drive chain adjuster 13760
13762 chain take-up arm assembly 13762
13763 chain take-up idler assembly 13763
13764 chain take-up master assembly 13764
13764.1 chain take-up master cylinder housing 13764.1
13764.2 chain take-up master cylinder piston rod assembly 13764.2
13765 chain take-up slave cylinder 13765
13765.1 chain take-up slave cylinder housing 13765.1

13765.2 chain take-up slave cylinder piston rod assembly 13765.2
13766 chain take-up auto adjust 13766
13766.1 chain take-up auto adjust pump 13766.1
13766.2 chain take-up auto adjust tank 13766.2
13766.3 chain take-up auto adjust pres relief 13766.3
13766.4 chain take-up auto adjust r1 13766.4
13766.5 chain take-up auto adjust r2 13766.5
13766.6 chain take-up auto adjust v1 13766.6
13766.7 chain take-up auto adjust v2 13766.7
13767 chain take-up slop cylinder 13767
13767.1 chain take-up slop cylinder housing 13767.1
13767.2 chain take-up slop cylinder piston 13767.2
13768 chain take-up overload accumulator 13768
13769 chain take-up piping 13769
13770 chain take-up cam 13770
13772 chain take-up pivot 13772

Figure 19:
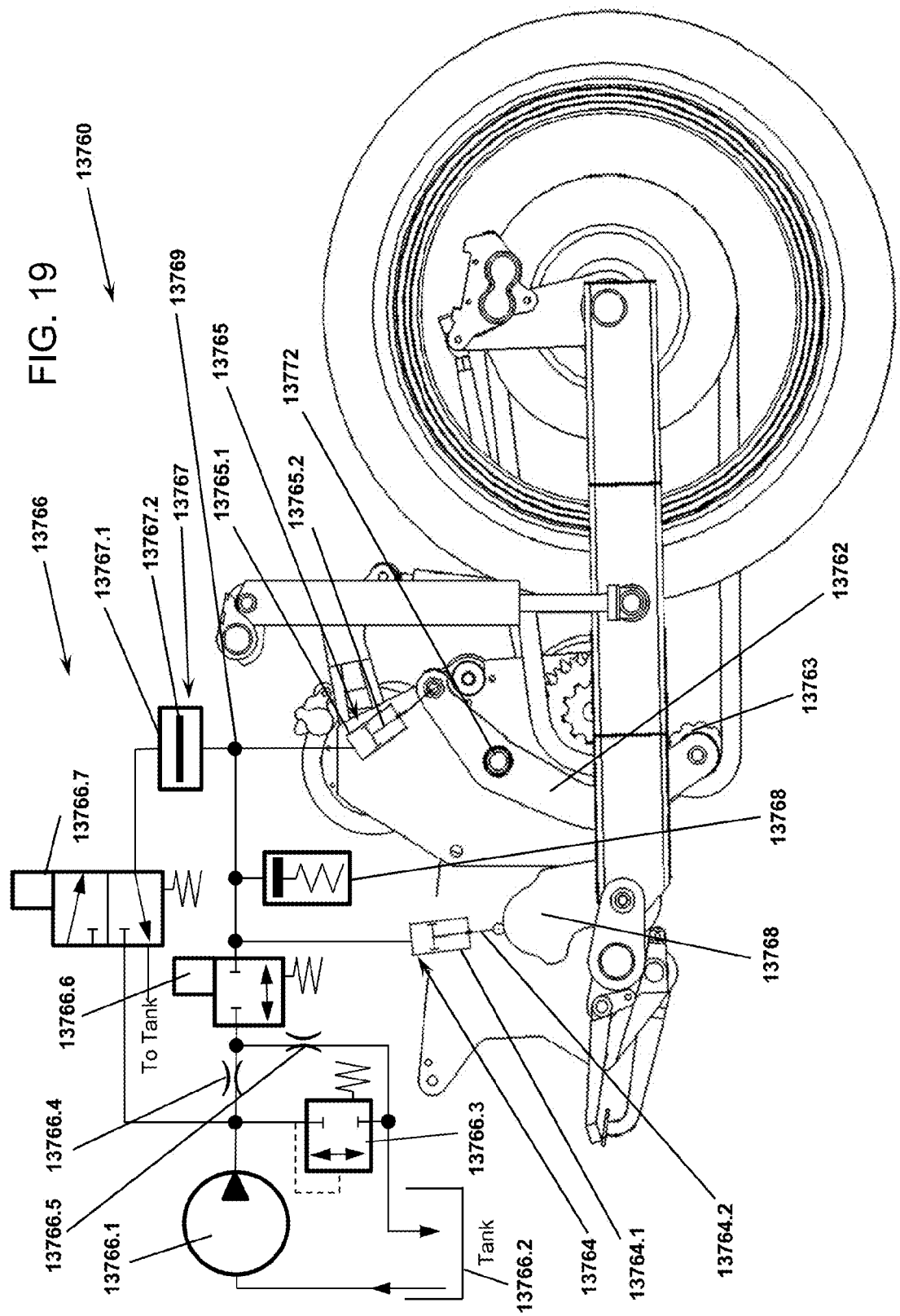
FIG. 19 is a side view showing yet another alternative embodiment chain adjustment with hydraulic actuation and with overload protection and automatic static adjustment.

FIG. 19 is a diagram, partially schematic, of a thirteenth embodiment of the improved final drive chain adjuster 13760. This embodiment also features a hydraulic-based subsystem similar to the twelfth embodiment, except that this embodiment incorporates an automatic static adjust system and an overload protection system.

In this embodiment, the overload protection system features a chain take-up overload accumulator 13768 which is a hydraulic accumulator, either of the gas-charged or spring-charged type. This accumulator has a precharge (gas charged) or preload (spring charged) on its separator piston, which is set at the desired limit pressure corresponding to the desired overload protection system force limit. If the force acting on the chain take-up idler assembly 13763 exceeds the limit force, the hydraulic pressure positioning the chain take-up idler assembly 13763 pushes fluid into the chain take-up overload accumulator 13768, thus letting the chain take-up idler assembly 13763 move rearwards, thereby limiting the force. This overload protection system may also be incorporated to the twelfth embodiment.

The automatic static adjust system includes a chain take-up auto adjust tank 13766.2, a chain take-up auto adjust pump 13766.1, and three valves: a pressure relief valve—chain take-up auto adjust pressure relief 13766.3, an auto adjust control valve—chain take-up auto adjust v1 13766.6, and a slop cylinder charging valve—chain take-up auto adjust v2 13766.7; two hydraulic resistors or orifices: chain take-up auto adjust r1 13766.4 and chain take-up auto adjust r2 13766.5; and assorted hydraulic piping—chain take-up piping 13769. The chain take up auto adjust pump 13766.1 pumps fluid from the chain take-up auto adjust tank 13766.2, and via piping, supplies hydraulic pressure to chain take-up auto adjust pressure relief 13766.3 and to chain take-up auto adjust v2 13766.7. A reduced pressure is supplied to chain take-up auto adjust v1 13766.6, which is a function of the fluid resistors—chain take-up auto adjust r1 13766.4 and chain take-up auto adjust r2 13766.5.

Referring still to FIG. 19, the slop cylinder chain take-up slop cylinder 13767 includes a housing—chain take-up slop cylinder housing 13767.1, and a separator piston—chain take-up slop cylinder piston 13767.2, which is allowed a limited displacement of motion in the housing.

When the operator actuates the automatic static adjust system, the pump is started, chain take-up auto adjust v2 13766.7 connects the pump supply pressure to the backside of the chain take-up slop cylinder 13767, the chain take-up auto adjust v1 13766.6 connects a lower pressure to the chain take-up master cylinder 13764, the chain take-up slave cylinder 13765, and the front side of the chain take-up slop cylinder 13767. Because the back side of the chain take-up slop cylinder 13767 has higher pressure than the front side, the chain take-up slop cylinder piston 13767.2 pushes out any fluid on the front side, and bottoms against the chain take-up slop cylinder housing 13767.1. The reduced pressure supplied to the chain take-up slave cylinder 13765 and the chain take-up master cylinder 13764 supply tension to the final loop drive element 744. This is similar to conditions at point 2 in FIG. 2G of the first embodiment. When the operator stops actuating the automatic static adjust system, the chain take-up auto adjust pump 13766.1 turns off, the chain take-up auto adjust v2 13766.7 connects the backside of the chain take-up slop cylinder 13767 to the chain take-up auto adjust tank 13766.2, and chain take-up auto adjust v1 13766.6 closes and thus locks hydraulic fluid 13771 in the tensioning system. Since the chain take-up slop cylinder 13767 does not have pressure on the backside of the chain take-up slop cylinder piston 13767.2, the chain take-up slop cylinder piston 13767.2 can move and the volume in the tensioning system increases by the differential volume of the piston's movement. This circumstance is somewhat analogous to moving from point 2 to point 3 in FIG. 2G of the first embodiment.

Detailed Description of a Fourteenth Embodiment

Here follows a listing of the components and their drawing figure label numerals for a fourteenth embodiment of the improved final drive chain adjuster:
14760 final drive chain adjuster 14760
14762 chain take-up arm assembly 14762
14763 chain take-up idler assembly 14763
14764 chain take-up actuator 14764
14765 chain take-up controller 14765
14766 chain take-up arm sensor 14766
14767 trailing arm sensor 14767
14772 chain take-up pivot 14772

Figure 20:
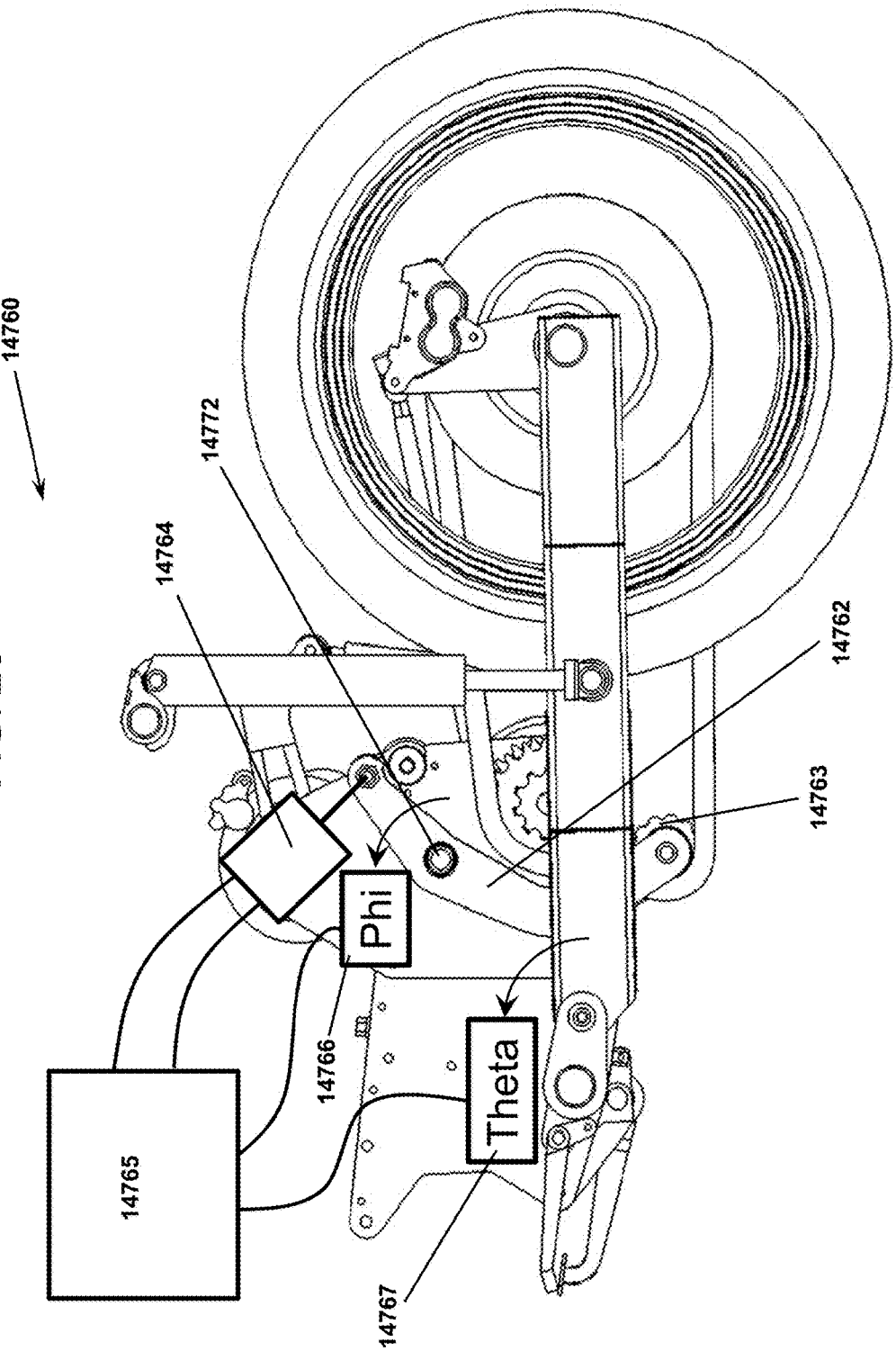
FIG. 20 is a side view showing still another alternative embodiment chain adjustment system, with electric actuation.

The fourteenth embodiment of the improved final drive chain adjuster 14760 is depicted in FIG. 20. As with selected other embodiments, the chain take-up idler assembly 14763 is positioned by the single chain take-up arm assembly 14762. In this embodiment, chain take-up arm assembly 14762 is positioned by an electric actuator chain take-up actuator 14764. The actuator 14764 supplies an actuation force onto the chain take-up arm assembly 14762. The position of chain take-up arm assembly 14762 is detected and measured by a sensor chain take-up arm sensor 14766. The trailing arm 510 position also is detected and measured by a sensor trailing arm sensor 14767. A chain take-up controller 14765 measures output from the trailing arm sensor 14767 and moves the chain take-up idler assembly 14763 to a proper position based on an algorithm and logic similar to that used by the other embodiments.

As with the other disclosed embodiments, it is desired that the chain take-up arm assembly 14762 (idler arm) be positioned as a function of the trailing arm 510 position, with an offset based on the static chain adjustment. A simple control algorithm for this purpose may be based on a limited single column table look up scheme, using the trailing arm angular position as the input, and a nominal idler arm position as the output. This nominal output would then be corrected to a desired idler arm position based on an offset static chain adjustment bias. The offset static chain adjustment bias could be determined by an auto adjust sequence similar to that described with reference to FIG. 2 G. A closed-loop position control could then be used to position the idler arm (chain take-up arm assembly 14762) with the electric actuator (chain take-up actuator 14764) to the desired position based on the biased nominal idler arm position.

An improved control scheme would be to use a multi-column, trailing-arm-angle-to-desired-idler-arm-position look up table, with virtual chain length as a parameter. Based on the static adjustment process, a virtual chain length could be determined, and then the corresponding look-up table column used to determine the desired idler arm position which would account for the nonlinearities in the chain adjustment geometry. This desired idler arm position could then be used in the closed-loop position control.

An alternative electric system may use an actuator which supplies position while measuring actuation force. This would simplify the actuator position control loop in the controller.

As with the other embodiments, an overload protection system may be used to reduce damage to components in the chain drive. In this fourteenth embodiment, an overload protection system may be more beneficial, because the electric system would have a cost to position performance trade-off. With an overload protection system, a less expensive electrical system could be used, while providing satisfactory chain adjust (which may require more use of the overload protection system to mitigate errors in chain take-up idler assembly 14763 positioning).

Added Features

FIG. 21 and FIGS. 22, 23A, 23B, 23C, 24A, 24B, 25A and 25B present some alternatives which could be used to isolate from chain vibration the improved final drive chain adjuster. As is commonly known, because of the finite chain pitch length, the speed and motion of a chain drive is not constant but instead has a high frequency wave superimposed onto the base chain motion. With the addition of some rubber isolation layers between the idler cog and the idler bearing chain noise can be decreased. Additional isolation could be realized with the addition of rubber on the cam follower, both as an outside layer, or as an inner layer with a stiff covering on the outside to improve wear against the cam. The adjustment barrel could provide isolation with some rubber elements. Following are components which may be isolated by incorporating isolation layers or elements fabricated from rubber (or other suitable shock absorptive material), as seen in FIG. 21 and FIGS. 22-25B.

14762 chain take-up arm assembly 14762
14763 chain take-up idler assembly 14763
14764 chain take-up actuator 14764
14765 chain take-up controller 14765
14766 chain take-up arm sensor 14766
14767 trailing arm sensor 14767
14772 chain take-up pivot 14772
8763 Isolated chain take-up idler 8763
8763.1 Chain take-up cog 8763.1
8763.2 Chain take-up rubber isolator 8763.2
8763.3 Chain take-up bearing 8763.3
8763.4 Chain take-up hat bushing 8763.4
8764.1 Isolated chain take-up cam follower 8764.1
8764.2 Chain take-up cam follower fastener 8764.2
8764.3 Chain take-up cam follower rubber isolator 8764.3
8764.4 Chain take-up cam follower rolling surface 8764.4
9764.1 Isolated chain take-up cam follower 9764.1
9764.2 Isolated Chain take-up cam follower fastener 9764.2
9764.3 Chain take-up cam follower soft rolling surface 9764.3
9766 Isolated Chain take-up adjustment barrel 9766
9766.1 Chain take-up barrel 9766.1
9766.2 Chain take-up barrel rubber isolator 9766.2
9766.3 Chain take-up barrel hat bushing 9766.3

Table 1 provides a partial list of the above embodiments as well as some additional ones. Different vehicles which could benefit from the improved final drive chain adjuster would certainly benefit more from one embodiment than others.

While the foregoing written description of the improved final drive chain adjuster enables one of ordinary skill to make and use this invention, those of ordinary skill will understand and appreciate the existence of variations, combinations, and equivalents of the specific embodiments, methods and examples herein. The invention should therefore not be limited by the above described embodiments, methods, and examples, but by all embodiments and methods within the scope and spirit of the invention.

I claim:

1. A drive chain adjuster system for use on a vehicle having a frame,
a power source, a trailing arm rotatably mounting a wheel, a driving pinion driven by the power source, a driven pinion rotatably fixed to the wheel, a loop drive idler assembly and a loop drive element for transferring power from the driving pinion to the driven pinion, the adjuster sub system comprising:
a take-up cam;
a loop drive idler assembly position determined by movement of the take-up cam;
wherein a movement of the trailing arm causes a movement of the loop drive idler assembly via the take-up cam, thereby keeping substantially constant, over a range of motion of the trailing arm, a tension in at least a portion of the loop drive element.

2. A system according to claim 1, wherein the take-up cam is pivotally movable in response to a movement of the trailing arm, and wherein the idler assembly comprises an idler roller, and wherein the system further comprises:
a take-up pivot mountable on the vehicle;
a take-up arm assembly pivotal upon the take-up pivot; and
a take-up cam follower rotatably mounted on the take-up arm assembly and in rolling contact with the take-up cam;
wherein the idler roller is rotatably disposed on the take-arm arm assembly and engageable with the loop drive element, and further wherein the movement of the trailing arm causes a pivotal movement of the take-up cam, and the pivotal movement of the take-up cam causes a movement of the take-up arm assembly, which movement of the take-up arm assembly moves the idler roller to increase or to decrease the tension in the loop drive element.

3. The system of claim 2 wherein the take-up pivot is mounted into a chassis of the vehicle.

4. The system of claim 3 wherein the take-up cam is fixedly mounted upon the trailing arm, and further wherein the take-up arm assembly comprises:
a take-up idler arm assembly pivotally disposed upon the take-up pivot; and
a take-up cam arm assembly pivotally disposed upon the take-up pivot;
the take-up idler arm assembly and the cam arm assembly having a common axis of rotation, the take-up idler arm assembly and the cam arm assembly being separately pivotal about the common axis of rotation to define a variable angular relationship to each other.

5. The system of claim 4 wherein the take-up cam follower is rotatably mounted on the take-up cam arm assembly in rolling contact with an eccentric profile of the take-up cam, and the idler roller is rotatably disposed on the take-up idler arm assembly.

6. The system of claim 5 further comprising means for adjusting the variable angular relationship of the take-up idler arm assembly and the cam arm assembly, the means for adjusting comprising an adjustment assembly extending between the idler arm assembly and the cam arm assembly and means for limiting a maximum chain tension on a lower side of the loop drive element, the adjustment assembly and the means for limiting comprising:
 a first connector connected with the idler arm assembly;
 a second connector connected with the cam arm assembly; and
 a threaded adjustment screw slidably disposed through one of the connectors and screwably engaged with the other one of the connectors;
 an adjustment pre/overload spring operatively associated with the first connector and with the second connector, wherein a compression in the adjustment pre/overload spring urges an increase in the distance of separation, which urging is regulated by the adjustment screw;
wherein rotation of the adjustment screw changes a distance of separation between the first connector and the second connector, and wherein changing the distance of separation adjusts the variable angular relationship of the take-up idler arm assembly and the cam arm assembly; and
wherein rotation of the adjustment screw to decrease the distance of separation adjusts the variable angular relationship of the take-up idler arm assembly and the cam arm assembly, thereby moving the idler roller toward the wheel to decrease an effective chain path length to decrease tension in the final loop drive element.

7. The system of claim 3 wherein the take-up cam is fixedly mounted upon the trailing arm, and further wherein the take-up arm assembly comprises:
 a take-up idler arm assembly pivotally disposed upon the take-up pivot; and
 a take-up cam arm assembly pivotally disposed upon the take-up pivot;
the take-up idler arm assembly and the cam arm assembly having a common axis of rotation, the take-up idler arm assembly and the cam arm assembly being separately pivotal about the common axis of rotation to define a variable angular relationship to each other.

8. The system of claim 7 wherein the take-up cam follower is rotatably mounted on the take-up cam arm assembly in rolling contact with an eccentric profile of the take-up cam, and the idler roller is rotatably disposed on the take-up idler arm assembly.

9. The system of claim 8 further comprising means for adjusting the variable angular relationship of the take-up idler arm assembly and the cam arm assembly, comprising an adjustment assembly extending between the idler arm assembly and the cam arm assembly, the adjustment assembly comprising:
 a first connector connected with the idler arm assembly;
 a second connector connected with the cam arm assembly; and
 a threaded adjustment screw slidably disposed through one of the connectors and screwably engaged with the other one of the connectors;
wherein rotation of the adjustment screw changes a distance of separation between the first connector and the second connector, and wherein changing the distance of separation adjusts the variable angular relationship of the take-up idler arm assembly and the cam arm assembly.

10. The system of claim 9 further comprising means for limiting a maximum chain tension on a lower side of the loop drive element, the means for limiting comprising:
 an elongated slot, having an end, defined in the cam arm assembly, wherein the second connector is slidably mounted in the slot; and
 a take-up adjustment overload spring disposed between, and pushing longitudinally between, the second connector and the chain take-up cam arm assembly;
wherein the adjustment overload spring urges the second connector against the end of the slot in a direction away from the chain take-up idler arm assembly.

11. The system of claim 2 wherein the vehicle has a roll bar assembly and the take-up cam is rotatably mountable at the roll bar assembly.

12. The system of claim 11 wherein the roll bar assembly comprises a roll bar arm, and further comprising a tie rod operably connected to, and extending between, the roll bar arm and the trailing arm.

13. The system of claim 2 wherein the take-up arm assembly comprises:
 a take-up idler arm assembly pivotally disposed upon the take-up pivot; and
 a take-up cam arm assembly pivotally disposed upon the take-up pivot;
the take-up idler arm assembly and the cam arm assembly having a common axis of rotation, and the take-up idler arm assembly and the cam arm assembly being separately pivotal about the common axis of rotation to define a variable angular relationship to each other.

14. The system of claim 13 wherein the take-up cam follower is rotatably mounted on the take-up cam arm assembly in rolling contact with an eccentric profile of the take-up cam, and the idler roller is rotatably disposed on the take-up idler arm assembly.

15. The system of claim 13 wherein the take-up idler arm assembly and the cam arm assembly are axially aligned with each other upon the take-up pivot.

16. The system of claim 13 wherein the take-up idler arm assembly and the cam arm assembly are axially offset from each other upon the take-up pivot.

17. The system of claim 13 further comprising means for adjusting the variable angular relationship of the take-up idler arm assembly and the cam arm assembly.

18. The system of claim 17 wherein the means for adjusting the variable angular relationship comprises an adjustment assembly extending between the idler arm assembly and the cam arm assembly, the adjustment assembly comprising:
 a first connector connected with the idler arm assembly;
 a second connector connected with the cam arm assembly; and
 a threaded adjustment screw slidably disposed through one of the connectors and screwably engaged with the other one of the connectors;
wherein rotation of the adjustment screw changes a distance of separation between the first connector and the second connector, and wherein changing the distance of separation adjusts the variable angular relationship of the take-up idler arm assembly and the cam arm assembly.

19. The system of claim 18 wherein rotation of the adjustment screw to decrease the distance of separation adjusts the variable angular relationship of the take-up idler arm assembly and the cam arm assembly, thereby moving the idler roller away from the wheel to increase an effective chain path length to increase tension in the final loop drive element.

20. The system of claim 18 wherein the first connector comprises an adjustment barrel with lock revolutely mounted to the idler arm assembly, and the second connector comprises an adjustment threaded barrel revolutely mounted to the cam arm assembly, and further comprising a take-up adjustment preload spring operatively associated with the adjustment barrel with lock and with the adjustment threaded barrel, wherein a compression in the adjustment preload spring urges an increase in the distance of separation, which urging is regulated by the adjustment screw.

21. The system of claim 18 further comprising means for limiting a maximum chain tension on a lower side of the loop drive element, the means for limiting comprising:
   an elongated slot, having an end, defined in the cam arm assembly, wherein the second connector is slidably mounted in the slot; and
   a take-up adjustment overload spring disposed between, and pushing longitudinally between, the second connector and the chain take-up cam arm assembly;
wherein the adjustment overload spring urges the second connector against the end of the slot in a direction away from the chain take-up idler arm assembly.

22. The system of claim 21 wherein the adjustment overload spring is compressed and has a stiffness such that a force required to move the idler roller against the stiffness of the overload spring, exceeds a maximum force the loop drive element applies to the idler roller.

23. The system of claim 2 wherein the take-up pivot is mounted into a chassis of the vehicle and the take-up cam is fixedly mounted upon the trailing arm; and further comprising hydraulic actuation means for converting motion of the take-up cam into corresponding motion in the take-up arm assembly.

24. A drive chain adjuster system for use on a vehicle having a frame, a power source, a trailing arm rotatably mounting a wheel, a driving pinion driven by the power source, a driven pinion rotatably fixed to the wheel, a loop drive idler assembly and a loop drive element for transferring power from the driving pinion to the driven pinion, the adjuster subsystem comprising:
   a take-up cam;
   a loop drive idler assembly position determined by movement of the take-up cam;
wherein a movement of the trailing arm causes a movement of the loop drive idler assembly by the take-up cam, thereby keeping substantially constant, over a range of motion of the trailing arm, a tension in at least a portion of the loop drive element.

25. A drive chain adjuster system for use on a vehicle having a frame, a power source, a trailing arm rotatably mounting a wheel, a driving pinion driven by the power source, a driven pinion rotatably fixed to the wheel, a loop drive idler assembly and a loop drive element for transferring power from the driving pinion to the driven pinion, the adjuster subsystem comprising:
   a take-up cam;
   a loop drive idler assembly position determined by movement of the take-up cam;
wherein a movement of the trailing arm causes a movement of the loop drive idler assembly by the take-up cam, thereby keeping substantially constant, over a range of motion of the trailing arm, a loop drive path length around the driving pinion, the driven pinion and the loop drive idler.

26. A drive chain adjuster system for use on a vehicle having a frame, a power source, a trailing arm rotatably mounting a wheel, a driving pinion driven by the power source, a driven pinion rotatably fixed to the wheel, a loop drive idler assembly and a loop drive element for transferring power from the driving pinion to the driven pinion, the adjuster subsystem comprising:
   a take-up cam;
   a loop drive idler assembly position determined by movement of the take-up cam;
   a take-up pivot mountable on the vehicle;
   a take-up arm assembly pivotal upon the take-up pivot; and
   a take-up cam follower rotatably mounted on the take-up arm assembly and in rolling contact with the take-up cam;
wherein a movement of the trailing arm causes a movement of the loop drive idler assembly via the take-up cam, thereby keeping substantially constant, over a range of motion of the trailing arm, a tension in at least a portion of the loop drive element;
wherein the take-up cam is pivotally movable in response to a movement of the trailing arm, and wherein the idler assembly comprises an idler roller;
wherein the idler roller is rotatably disposed on the take-arm arm assembly and engagable with the loop drive element, and further wherein the movement of the trailing arm causes a pivotal movement of the take-up cam, and the pivotal movement of the take-up cam causes a movement of the take-up arm assembly, which movement of the take-up arm assembly moves the idler roller to increase or to decrease the tension in the loop drive element;
wherein the take-up pivot is mounted into a chassis of the vehicle; and
wherein the vehicle has a roll bar assembly and the take-up cam is rotatably mountable at the roll bar assembly.

27. The system of claim 26 wherein the roll bar assembly comprises a roll bar arm, and further comprising a tie rod operably connected to, and extending between, the roll bar arm and the trailing arm.

28. The system of claim 26 wherein the take-up arm assembly comprises:
   a take-up idler arm assembly pivotally disposed upon the take-up pivot; and
   a take-up cam arm assembly pivotally disposed upon the take-up pivot;
the take-up idler arm assembly and the cam arm assembly having a common axis of rotation, and the take-up idler arm assembly and the cam arm assembly being separately pivotal about the common axis of rotation to define a variable angular relationship to each other.

29. The system of claim 28 wherein the take-up cam follower is rotatably mounted on the take-up cam arm assembly in rolling contact with an eccentric profile of the take-up cam, and the idler roller is rotatably disposed on the take-up idler arm assembly.

30. The system of claim 28 wherein the take-up idler arm assembly and the cam arm assembly are axially aligned with each other upon the take-up pivot.

31. The system of claim 28 further comprising means for adjusting the variable angular relationship of the take-up idler arm assembly and the cam arm assembly.

* * * * *